(12) United States Patent
Loughrey et al.

(10) Patent No.: US 8,573,496 B2
(45) Date of Patent: Nov. 5, 2013

(54) TAG READING APPARATUS AND A METHOD OF READING A TAG

(76) Inventors: Kevin Loughrey, Gymea Bay (AU); Ivan Curtis, Vale Park (AU); Michael Evans, Stroud (GB)

( * ) Notice: Subject to any disclaimer, the term of this patent is extended or adjusted under 35 U.S.C. 154(b) by 35 days.

(21) Appl. No.: 13/331,613

(22) Filed: Dec. 20, 2011

(65) Prior Publication Data

US 2013/0153657 A1  Jun. 20, 2013

(51) Int. Cl.
*G06K 7/14* (2006.01)
(52) U.S. Cl.
USPC ............................................. 235/454
(58) Field of Classification Search
USPC .......................................... 235/454
See application file for complete search history.

(56) References Cited

U.S. PATENT DOCUMENTS

| 4,760,247 A | * | 7/1988 | Keane et al. | 235/454 |
| 5,814,801 A | * | 9/1998 | Wang et al. | 235/454 |
| 6,053,407 A | * | 4/2000 | Wang et al. | 235/454 |

* cited by examiner

*Primary Examiner* — Jamara Franklin
(74) *Attorney, Agent, or Firm* — Michael Molins

(57) ABSTRACT

Tagging apparatus associated with applying and reading a tag adapted to store a number. The tag comprising a plurality of substantially identical two dimensional arrays of dots, each array being indicative of the number for improving tag detection; each arrays comprise a plurality of clusters, each cluster representing a predetermined symbol being indicative of a part of the number. An etching apparatus, for creating a pattern of dots, comprising a plurality of laser sources held in a manifold defining any one or more of a vector grid, or array grid. A tagging reading apparatus comprising a lens element being adapted to control focus, zoom and ingress light; an image capture element for obtaining image data; a processor element adapted to apply one or more digital processing functions to the image; the processor element being adapted to calculate code data indicative of the tag number.

10 Claims, 28 Drawing Sheets

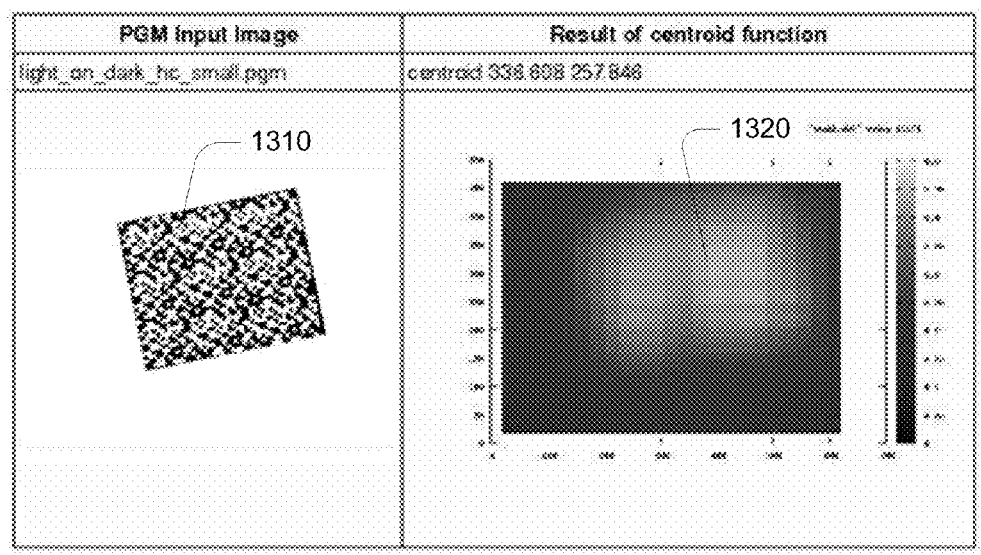
FIG. 13A  FIG. 13B
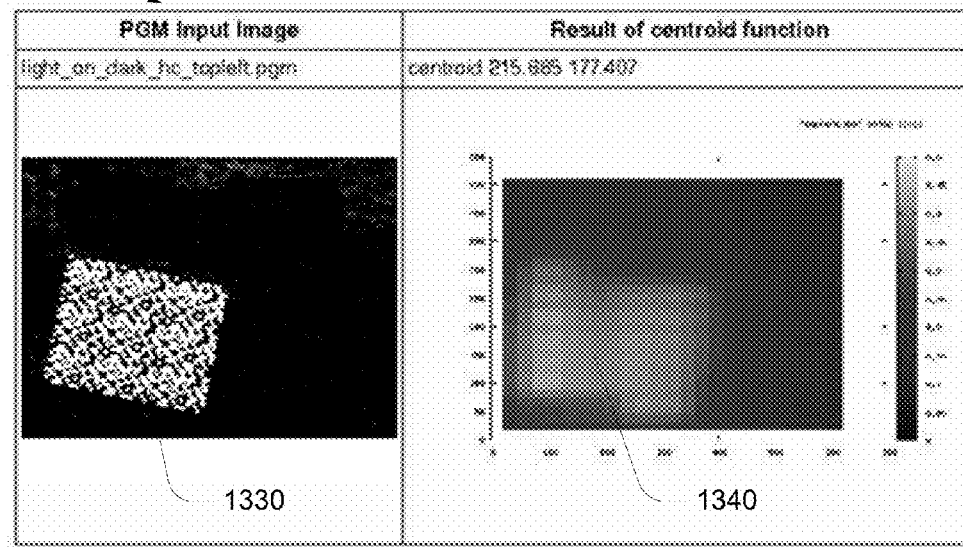
FIG. 13C  FIG. 13D

1900

TAG READING APPARATUS AND A METHOD OF READING A TAG

FIELD OF THE INVENTION

The present invention relates to identification tagging of objects and in particular to apparatus for applying and/or reading identification tags on objects.

The invention has been developed primarily for use as an apparatus for identification tagging of objects and will be described hereinafter with reference to an example application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

There is a commercial and organisational demand to identify objects/articles for the purposes of facilitating transactions such as point of sale and administrative functions such as stock-takes. An ID system can be required to facilitate the tracking of an item through a process or system. For example, within the military and law enforcement agencies, there is a need to rigorously account for and track items that would pose a serious threat to the public, or would seriously compromise the effectiveness of these agencies should they be possessed by terrorists, criminals or opposing military forces.

In the past this need has been met by:

plain language;

barcodes; and

Radio Frequency Identification (RFID); and tags applied to the item of interest.

Known systems for marking of an object include:

generic identification of the type of object as belonging to a group or family; and explicit identification of an object within a group of the same type by use of a serial number.

In some known systems both of these forms of identification are used, i.e., the tag provides the item's nomenclature and also provides a serial number that is unique amongst that item's population, either globally or within the company or organisation within which that item is held.

There is often a need, with computerised databases, to use a unique serial number to enable unique identification of an object, object type and object provenance.

OBJECT OF THE INVENTION

It is an object of the present invention to overcome or ameliorate at least one of the disadvantages of the prior art, or to provide a useful alternative.

It is an object of the invention in a preferred form to provide an apparatus and method for two dimensional barcode identification tagging of objects.

It is an object of the invention in a preferred form to provide an apparatus and method for two dimensional barcode identification tagging of objects utilising a range of unique numbers.

It is an object of the invention in a preferred form to provide an apparatus and method for identifying a two dimensional barcode tag of objects.

SUMMARY OF THE INVENTION

General

An aspect of the invention comprises a suite of technology centred around a registry that allocates unique numbers, which are encrypted utilising either a symmetric or asymmetric algorithm, for the purposes of identifying physical entities, either generically or uniquely, which are of interest to a person or organisation. This technology suite is preferably comprised of:

a registry of unique numbers from these unique numbers are issued;

a two dimensional (2D) bar code symbology to represent the numbers allocated from the registry;

a labelling system consisting of a tag, label, or an etched pattern on the object itself, that carries the bar code;

an apparatus for laser etching the numbers onto the surface of objects;

a reader for:

recognizing the bar code in its field of view;

manipulating the image such that it is in the correct proportions for further analysis;

extracting a value from the pattern depicted by the barcode;

an apparatus for decoding, and decrypting when a symmetric key encryption system is used, the numbers.

Preferably, decrypting the value utilises a secret key (in the case of symmetric key encryption, say, AES256) or using a public key (in the case of asymmetric encryption, say, using elliptic curve cryptography) to ascertain if the number originated from the registry. More preferably, the decrypted value (and if necessary the encrypted value) is passed onto a computer or other digital circuitry for further processing.

Preferably, the apparatus includes a computing device having software, primarily developed on Open Source Software so that it may be freely distributed, with the purpose of facilitating the uptake and use of this technology by people with relatively little detailed knowledge in the discipline of computing science.

Preferably, the term tag describes either an adhesive label or a label attached by some other means. For example, a cable-tie, to an object; the label being made of whatever material, including metallic plate, that is appropriate for the task. Typically, the tag will have had applied to it by some means a pattern representing a value which may be used as a unique identifier. The term "tagging" an object may mean the application of a "tag" or it may mean indelibly etching/tattooing the surface of the object. More preferably, the pattern represents a value according to pre-defined rules. Most preferably, the pattern represents a value which may be used as a unique identifier.

Unique Number Registry

According to a further aspect of the invention there is provided a method for allocating a first range of identifiers to a customer-system from a register, the method comprising the steps of:

receiving a request for identifiers from a new customer-system;

identifying a largest range of unallocated identifiers to define an available range within the entire range of identifiers belonging to the register;

identifying a midpoint in the largest available range; and allocating the identified midpoint as a start location for the customer-system range.

Preferably, identifiers in the allocated range are each encrypted, and identifier pairs comprising the allocated identifier and corresponding encrypted identifier are transmitted to the customer-system Preferably, a second range of identifiers allocated to a subsequent customer-system request is selected from substantially the midpoint of available identifiers defining a largest domain space distance. More preferably, the allocated range is selected from available identifiers defining a largest domain space distance. Most preferably, the domain space distance is defined as being the magnitude of the quantity of individual identifiers between: the beginning of the entire range of identifiers to the beginning of the first allocation of identifiers to a previous customer-system; or the end of a previous customer-system allocation to the beginning of another previous customer-system; or the end of a previous customer-system allocation to the end of the entire range of available identifiers.

Preferably, a second range of identifiers is allocated to the customer-system, the customer-system being previously allocated identifiers from the register, the method comprising of the steps of:

receiving a request for additional identifiers from an existing customer-system;

locating the end-point for that client's previously allocated customer-system range;

checking availability of sufficient unallocated additional identifiers that are contiguous (or serially-sequential) from the located end-point of the client's previously allocated customer-system range; and adding a record to a relevant database for maintaining a register of each allocated range.

According to a further aspect of the invention, there is provided a computer program product stored on a computer usable medium, the computer program product adapted to provide a method of providing a virtual community as herein described.

According to a further aspect of the invention there is provided a computer readable medium for operation with a processor device to provide a method of providing a virtual community as herein described.

According to an aspect of the invention there is provided an apparatus for managing unique identifiers comprising a processor coupled to a database, via a data network. One or more customers can access the processor for requesting an allocation of a range of unique identifiers. The processor is adapted to allocate one or more ranges of unique identifiers (or numbers) from a registry.

Preferably, the allocated range is selected from available identifiers defining the largest "domain space distance". The "domain space distance" is preferably defined as being the magnitude of the quantity of individual identifiers between:

the beginning of the entire range of identifiers to the beginning of the first allocation of identifiers to a previous customer-system; or the end of a previous customer-system allocation to the beginning of another previous customer-system; or the end of a previous customer-system allocation to the end of the entire range of available identifiers.

More preferably the beginning of the allocated range, for the next allocation to a new customer-system, is selected from substantially the midpoint of available identifiers defining the largest extant "domain space distance".

According to an aspect of the invention there is provided a database comprised of one or more tables for maintaining a register.

According to an aspect of the invention there is provided a method for allocating a first range of identifiers to a customer-system from a register, the method comprising:

receiving a request for identifiers from a new customer-system;

identifying a largest range of unallocated numbers (the "available range") within the entire range of numbers belonging to the register;

identifying a midpoint in the largest available range; and allocate the identified midpoint as a start location for the customer-system range.

Preferably, to allocate an additional range of identifiers to an existing customer-system that has previously been allocated numbers from the register, the method is comprised of the following steps:

receiving a request for additional identifiers from an existing customer-system;

locating the end-point for that client's previously allocated customer-system range;

checking availability of sufficient unallocated additional identifiers that are contiguous (or serially-sequential) from the located end-point of the client's previously allocated customer-system range; and adding a record to the relevant database table recording the customer-system ID, the date-time of issue, the start number and the end number.

The processor is preferably adapted to allocate one or more ranges of unique identifiers (or numbers) from a registry. The customer preferably owns and/or operates one or more systems that utilise an allocation of numbers. These systems are preferably comprised of various software applications and physical processes people or machines must carry out to produce a product or effect or to deliver a particular service. Preferably, each system is taken to need a different allocation of unique identifies. This allocation of unique identifiers is, by way of example only, illustrated by calling each request for a block of numbers as having been generated to satisfy the needs of a "customer-system". A customer-system is preferably allocated a range/block of identifiers/numbers and becomes the registered owner of that range/block of identifies.

Preferably, the server provides an algorithmic process that encrypts all numbers allocated. This algorithmic process may utilise symmetric (say, AES256) or asymmetric (say elliptic curve cryptography) to encrypt the numbers. When numbers are issued to a client system each unique number is issued in a pair; one being the number unencrypted, the other being the encrypted number. There is also provided to client-systems an apparatus for decoding an encrypted unique identifier, the apparatus including an input device adapted to receive data indicative of a mark (comprising a unique identifier); a processor adapted to receive and decode the data to provide an associated unique identifier; the processor coupled to a database and adapted to interrogate the database to receive relevant information.

Preferably the processor further authenticates and decrypts the data to provide an associated unique identifier.

According to an aspect of the invention there is provided a method for decoding a unique identifier which may be incorporated in the circuitry of the reader or be another discrete hardware device or, in the case of an asymmetric encryption system, be software resident, preferentially, on the computer that receives the code from the reader, the reader's method comprising the steps of:

receiving and decoding an identifier marking to provide an extracted code;

decrypting the extracted code to provide a composite code;

authenticating the composite code;

extracting a unique identifier from the composite code; and interrogating a database to provide an entry associated with the unique identifier.

According to a further aspect of the invention there is provided a computer program product for implementing a method for allocating a range of identifiers to a customer-system.

According to a further aspect of the invention there is provided computer-readable carrier medium carrying a set of instructions that when executed by one or more processors cause the one or more processors to carry out a method for allocating a range of identifiers to a customer.

According to a further aspect of the invention there is provided a computer program product for implementing a method for decoding a unique identifier.

According to a further aspect of the invention there is provided computer-readable carrier medium carrying a set of instructions that when executed by one or more processors cause the one or more processors to carry out a method for decoding a unique identifier.

Tagging an Entity of Interest

According to an aspect of the invention there is provided a tag for storing a number, the tag comprising:
  a plurality of substantially identical two dimensional arrays of dots, each array being indicative of the number for improving tag detection;
  each arrays comprise a plurality of clusters, each cluster representing a predetermined symbol being indicative of a part of the number.

Preferably each cluster (for example 3×3 dots) comprises a symbol pattern, wherein three black dots cannot occur in the horizontal and vertical direction and three white dots (or spaces) cannot occur in the horizontal and vertical direction. More preferably each symbol comprises a 9 bit representation defining a predetermined alphabet of 100 symbols. Most preferably, each symbol is indicative of a number between 0 and 99.

According to an aspect of the invention there is provided a tag for storing a very large binary number, the tag comprising:
  a plurality of dots defining a two dimensional array; and
  wherein the dots arranged in a series of identical arrays for improving detection and identification of orientation.

According to an aspect of the invention there is provided a tag system that uses dots to store a very large binary number and combined with the Digital Image Processing functions to allow for a reliable recovery of the tag code for various orientations of the tag to the reader and without requiring the tag pattern incorporating a fiducial mark.

According to a further aspect of the invention there is provided a tag system that uses dots to store a very large binary number.

According to a further aspect of the invention there is provided a tag system that stores a very large binary number by utilising dots arranged in a series of identical arrays.

According to a further aspect of the invention there is provided a tag system that uses dots to store a very large binary number as described herein and is capable of being made extremely small (for example, less than 4.5 mm by 3.6 mm).

The tag, as described herein, preferably consists of three layers:
  (a) a scratch resistant layer,
  (b) a layer upon which the array of dots is created, and
  (c) an adhesive layer consisting of an extremely strong glue.

Preferably, the tag (as described herein), wherein the glue preferably contains a material that strongly fluoresces under UV or other forms of electromagnetic radiation.

Apparatus for Etching

According to a further aspect of the invention there is provided etching apparatus for creating a pattern of dots, the apparatus comprising a plurality of laser sources held in a manifold defining any one or more of a vector grid, or array grid.

According to another aspect of the invention there is provided a method of creating a pattern of dots to represent a number created by an encryption algorithm for later decrypted by a tag reader. The method further utilizes a check code identify incorrect result and/or restricting use of tags that were not in accordance with a central registry.

Reader

According to an aspect of the invention there is provided a tag reading apparatus for reading a tag adapted to store a number, the apparatus comprising:
  a lens element being adapted to control focus, zoom and ingress light;
  an image capture element for obtaining image data;
  a processor element adapted to apply one or more digital processing functions to the image; the processor element being adapted to:
  calculate the presence and approximate centroid of a tag in the image data, and
  compute a framed image data indicative of the tag;
  extract a plurality of array segments each indicative of the number; and
  calculate, from the plurality of array segments, code data indicative of the number.

According to an aspect of the invention there is provided a tag reading apparatus for reading a tag adapted to store a very large binary number the apparatus comprising:
  an image capture element for receiving a first image having a first tag in view; and
  a processor element adapted to applying one or more digital processing functions to the image to orientate and scale the image thereby to provide a first orientated scaled array indicative of the binary number.

According to an aspect of the invention there is provided a tag reading apparatus for reading a tag adapted to store a very large binary number, the apparatus comprising:
  an image capture element for receiving a first image having a first tag in view;
  a processor element adapted to apply one or more digital processing functions to the image; wherein
  the processor element is adapted to orientate and scale the first image to thereby provide a first data matrix indicative of an orientated scaled image;
  the processor element is adapted to calculate a second data matrix indicative of an intermediate image of an isolated tag, and to extract therefrom a plurality of array segments each indicative of the binary number; and
  the processor element is adapted to calculate, from the plurality of array segments, a code vector indicative of the binary number.

Method of Reading Barcode

According to an aspect of the invention there is provided a method of reading a tag adapted to store a number, the method comprising the steps of:
  (detecting there are tags in the field of view by using an algorithm that calculates a value indicative of probability one or more tags is observed;
  calculating a location indicative of a centroid for each of the one or more tag within the field of view;
  receiving a first image data indicative of a first tag;
  orientating, scaling and framing the image data to generate a framed image data indicative of the first tag; and extracting, from the framed image data, a data matrix indicative of marks of the first tag;

extracting, from the data matrix, a plurality of array segments each indicative of the number;

calculating, from the plurality of array segments, a code data indicative of the number.

According to an aspect of the invention there is provided a method of reading a tag adapted to store a very large binary number, the method comprising the steps of:

receiving a first image having a first tag in view;

orientating and scaling the image such that the tag image substantially align with respective within a de-rotated image; and extracting, from the de-rotated image, a first array indicative of the binary number.

Software

According to a further aspect of this invention there is provided a suite of software that:

assists users of unique numbers provided by a registry to print the patterns comprising the barcodes using a commercially available printer;

communicate between readers and computers using radio-frequency and other common forms of digital communication; and create databases which hold records relating to the entities of interest that have been individually identified by a system herein disclosed.

BRIEF DESCRIPTION OF THE DRAWINGS

A preferred embodiment of the invention will now be described, by way of example only, with reference to the accompanying drawings in which:

FIG. 13A-FIG. 13D show images associate with detecting the existence and general location of a tag an the field of view;

PREFERRED EMBODIMENT OF THE INVENTION

Figure 1:
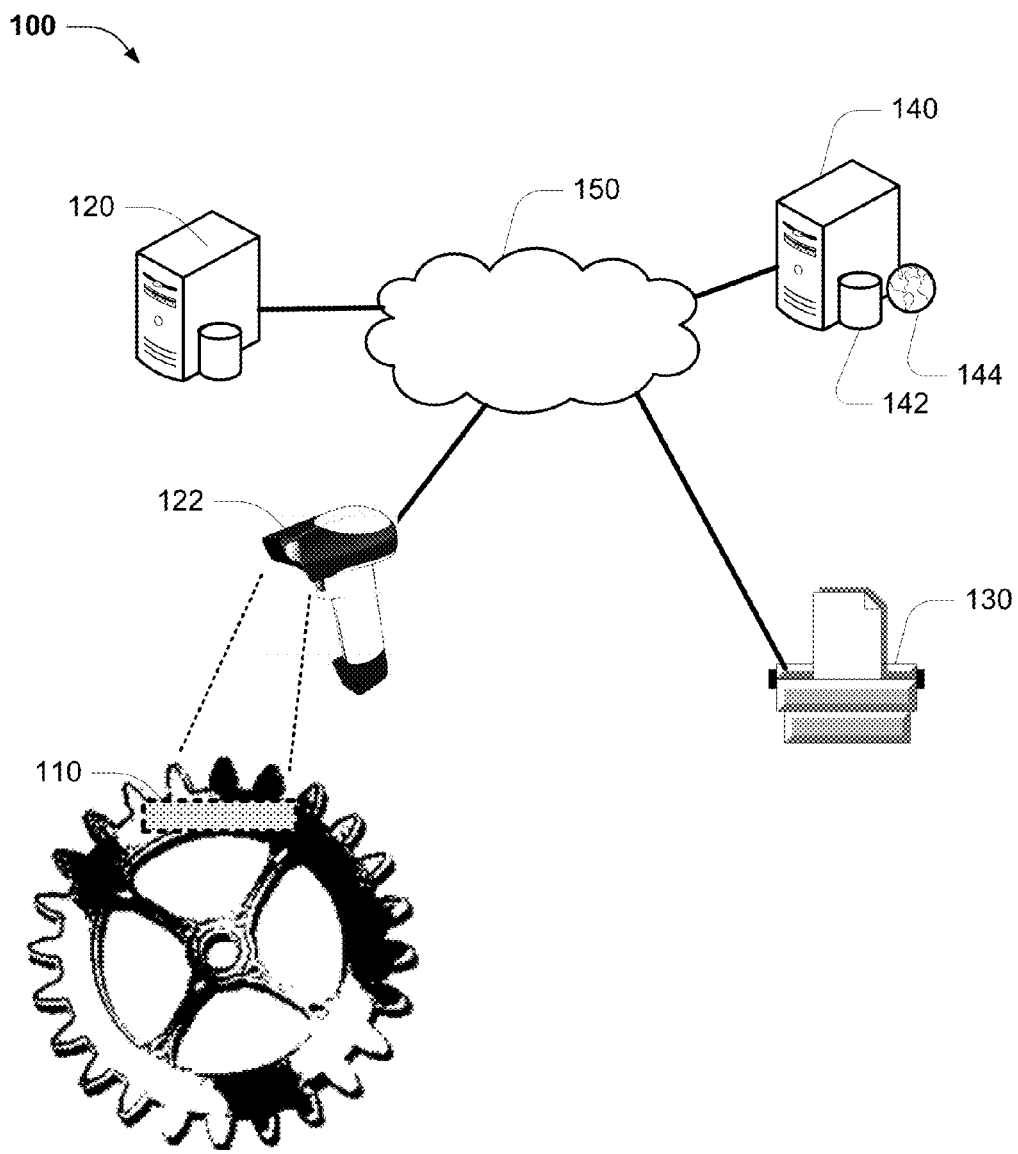
FIG. 1 is a schematic view an embodiment apparatus for two dimensional barcode identification tagging of objects.

It will be appreciated that an embodiment can provide a system of hardware and software for implementing a novel 2D barcode system, typically in combination with large range of unique numbers.

Some features associated with the apparatus and methods disclosed herein can be found in PCT publications WO2008/134804 and WO2011/006210.

PCT publications WO2008/134804 and WO2011/006210 are each incorporated herein by reference.

It will be further appreciated that, for a system to rely only on a serial number, there is a requirement that the serial number is never repeated. However, traditional barcodes that allow for very large numbers are usually of some considerable length, which typically makes them unsuitable for attachment to small articles. If an RFID tag is employed, it is possible to have an identification number of 64 bits (16× 1018) or greater. Using a system that employs a very large number will be satisfactory provided all users of this technology obtain their number from the same registry, thereby ensuring there is never any duplication. Therefore, for this to be usable world-wide there has to be a world-wide registry. Because both barcode and RFID technologies are in general use, it would be difficult to impose such as regime on this existing tagging system. However, with a new type of technology, managed by one entity, a system of unique numbering of articles would be possible, provided that technology broadly satisfied the needs of the majority of users.

In an embodiment, a system can incorporate any one or more of the following features:

the range of numbers being very, very large so as to be practically "inexhaustible";

the tag having a very low cost;

the tag being extremely durable;

the tag being reliably read in dirty conditions, attached to all types of articles and in all climates;

the reader and tag technology being simple and easy to obtain from numerous sources;

incorporated software interfaces a reader to a PC, and prints the ID tag's pattern;

the system of printing being suitable for most surfaces and capable of indelibly marking the object such that the marking cannot be easily abraded or besmirched to the point of unreadability, and the tag being capable of being made very small (so that it will fit on curved surfaces and objects with a wide range of size), while retaining the ability for the tag to be made to any size users' require for the particular application.

RFID Tags

Passive RFID tags do not require a battery as they are powered by an oscillating magnetic field, typically produced by the reader. As such, passive RFID tags satisfy most of the above except for: cost, readability in all conditions, and size.

Typically the lowest cost RFID tag is one that is passive and will cost somewhere between US$0.10 and US$0.15 to make once the chip is attached to a low cost foil antenna or leadframe. RFID tags can be affected by the object to which they are attached, for example, if the object is metal, it will interfere with the powering field being radiated by the reader and thereby diminish the range at which the tag can be read. RFID tags can also be affected by climatic conditions: particularly heat and cold. For example, if the temperature exceeds 50° C. or is less than −20° C. most low cost RFID tags will not function reliably. Similarly, depending on the frequency of excitation, RFID tags typically do not function to their full ability underwater. RFID tags, particularly those powered by UHF radiation, are generally larger than 10 mm by 10 mm in order to have a satisfactory range. This can limit the types of articles to which they can be attached.

A modern personal computer has provided businesses with processing ability and memory capacities for managing the business's database and documentation related to the users day to day activities. The Internet has allowed businesses to have global connectivity. A consequence, tags are typically not required to hold a history of the events pertaining to the item. Instead, an associated unique number can enable details associated with the item to be retrieved in substantially "realtime" from a database anywhere in the world. In contrast, when RFID tags were first conceived, even before they became a reality, the general thinking was focused on the advantages of having a "travelling database".

However, as previously described, this type of mobile storage is less desirable because of the connectivity provided by the Internet, the size of the storage that common portable devices (such as readers, laptops, and mobile phones) have and the ability to enable access to substantially real-time distributed databases. Therefore, requirements for a tagging system can include any one or more of the following:

cost effectiveness;

ability to be read in most situations/conditions;

a unique number having sufficient capacity;

the ability to indelibly mark or adhere/attach a tag to a range of articles (having flat and curved surfaces).

System Overview

Referring to FIG. 1, embodiments of an apparatus 100 for identification tagging of objects can include any one or more of:

a tag element 110 applied to an object;

a processor module 120 coupled to a reader module 122;

a label application module 130 (for example an etcher or printer); and a number registry 140 comprising a database 142 and interface module 144, which is accessible (for example via a data network 150) to the processor module 120 and/or the label application module 130.

2D Barcode Tag

In an embodiment, a tag element can present/represent data indicative of a large number. By way of example only, the tag element is referred to as a "Numerically-Unique Encrypted Redundant Array" (NU-ERA) tag. This tag is comprised of a plurality of marks (or dots) defining a two dimensional array.

In an embodiment the marks/dots can be arranged in clusters, each cluster complying to a set of rules. By way of example, wherein a number (such as three) three dots of the same form cannot occur continuously in either the horizontal or vertical directions, and thereby comprising a symbol that represents a numerical value—the clusters facilitating identification of the tag orientation and deciphering of the tag's value. The clusters define an array that provides the encrypted numerical value of the tag. A series of identical such arrays, laid out in a two dimensional framework, this redundancy providing an effective means of the tag still being capable of being read when a significant portion of the tag has been randomly damaged or dirtied. It will be appreciated that, the rules for populating each cluster are such that a barcode symbol will be populated with 'light' (of clear/absent) and dark dots or marks. This can eliminate the need for masks.

The tag can represent a relatively large binary number that has been encrypted and, applied to digital image processing functions described herein, can enable reliable recovery of the tag code: regardless of the orientation of the tag to the reader; and/or regardless of the marks/dots being light-coloured on a dark-coloured background or dark-coloured on a light-coloured background; and/or not require a fiducial mark.

It will be appreciated that, the tag (as described here) can be created on a film or sheet by printing an array of dots on the surface utilising an ink jet printer, a laser or some etching or peening device. The tag (as described above) can be further coated with abrasion resistant clear polymer, glass or a very thin layer of diamond in order to be extremely scratch resistant or a polymer in which there is placed a substance that will fluoresce when irradiated with a particular frequency of light, such as ultraviolet light; this polymer being smeared on such that it only occupies the divots created by the etching or peening.

Tag Reader

In an embodiment, a tag reader module can read a tag adapted to store a binary number. The reader module/apparatus can comprise any one or more of the following:

Optics that automatically adjust to enable reading of a tag, controlling focus, zoom and aperture.

An image capture element for receiving a first image indicative of a tag, or tags.

A processor element for applying digital processing functions to the image to:

locate the presence of the tag (or tags) in the field of view, digitally manipulate the image of the tag such that it is made to be substantially rectangular and having substantially the correct aspect ratio;

scale the image to generate a first orientated scaled array indicative of the number, determine/calculate the value of the clusters, determine/calculate the identical arrays through a series of correlations, and decrypt and validate the data extracted from the above actions such that the resultant value has a relatively high statistical chance of being correct—despite the tag possibly being damaged or dirtied—thereby to determine/calculate the value of the clusters.

A processing unit (for example based on common PC architecture) with any one or more of the following:
one or more storage elements (for example, Flash, RAM and/or Hard Drive),
input module (for example, a keyboard or mouse);
a display module for displaying an object being scanned and/or displaying input/output images enabling user communication with the reader; and
a software application for using the resultant value to identity the object.

A communications interface for enabling the reader module to communicate with a computing device or RF device.

Laser Etcher and Printing Apparatus

In an embodiment, a Laser Etcher/Printer apparatus can enable any one or more of the following:
a method of creating a pattern of marks/dots to represent a number created by an encryption algorithm. This pattern of marks (typically combined with the use of a check code) can be later decrypted by a tag reader to achieve an relatively low probability of the reader delivering an incorrect result. Tags are generated depicting numbers allocated, in accordance with a predefined schema, from a central registry.

using the Laser Etcher/Printing apparatus, the tag can be:
Preferably, indelibly created on the surface of the object to be identified.
Produced on a film or sheet by printing an array of dots on the surface (for example, utilising an ink jet printer, a laser printing system or an etching device) and then the film or sheet can be adhered or reliably attached to the object.
Generated on a film made of a tear-resistant material which is typically coated with abrasion resistant layer (for example clear polymer, glass or a very thin layer of diamond).
Etched onto a film, which can be adhered to the object, with the film containing a material that strongly fluoresces under UV or other forms of electromagnetic/magnetic excitation.
Etched directly onto the surface of a material to create divots into which a fluorescent material may be deposited—such that when fully prepared the completed tag may be substantially level with the surface of the object that has been etched and the dots created by the divots will reveal a 2D barcode symbology under UV or other forms of electromagnetic/magnetic excitation.
Generated level with the surface of the object, the tag is less prone to accumulating dirt and will be more resistant to abrasive/scratching damage.
Comprised of a film or a sheet of material (eg paper) and the etching system can, by way of example only, destroy the surface or the material's ability to fluoresce such that the area presents a black dot under UV illumination.
Generated using printing systems to consist of marks/dots laid down using a fluorescent material so as to present an array of dots; or obscure a substrate layer that is fluorescent so as to present a tag having only a background that fluoresces.

Number Registry

In an embodiment, a number registry apparatus and method can enable issuance of unique numbers. This registry is supported by a computer program product stored on a computer usable medium; the computer program product adapted to provide a method of providing an algorithm for the issuing of numbers from an extremely large domain such that:
Wastage of numbers can be relatively reduced.
Client-systems can be provided a contiguous range of unique numbers.
In instances where there are further issues of numbers made to existing client-systems, the numbers typically continue on from the number range previously issued to that client-system.

Tag Element

Figure 2:
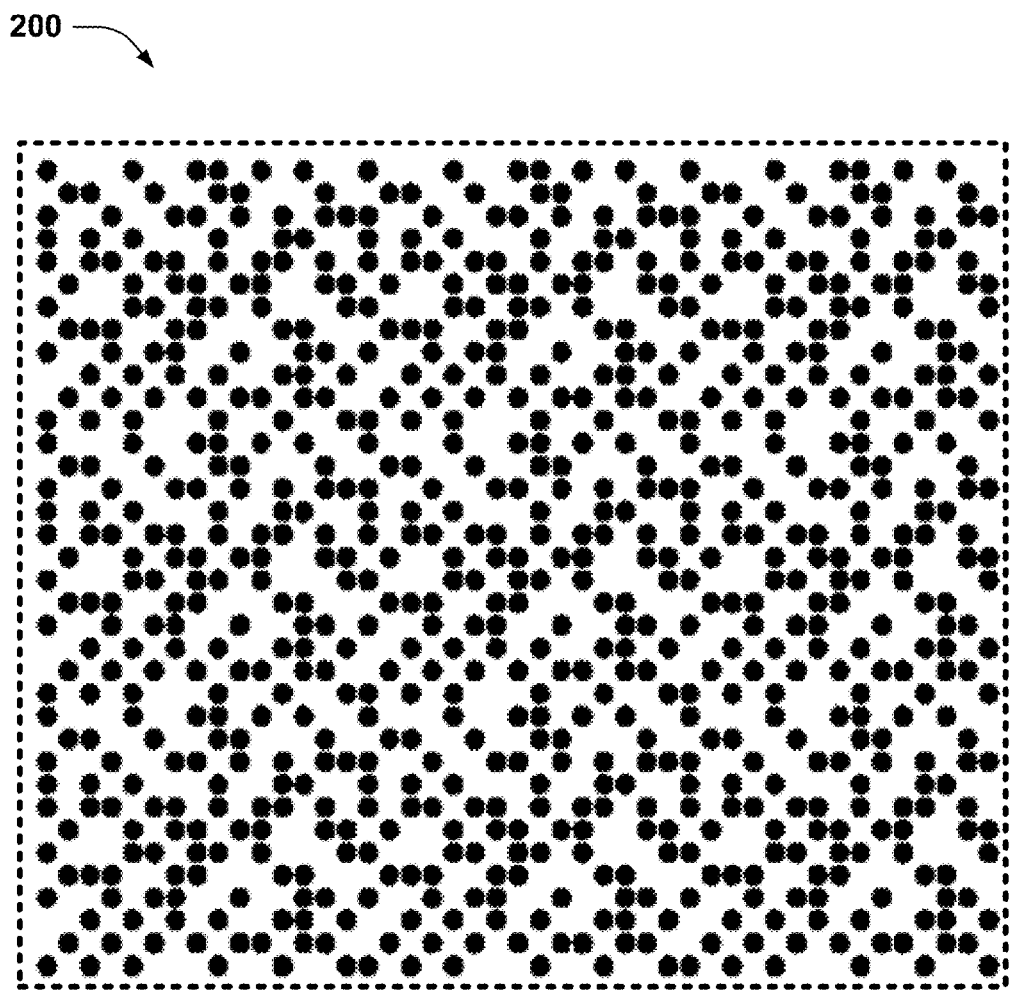
FIG. 2 is a schematic view of an embodiment tag element.

FIG. 2 shows an example embodiment tag element 200 comprising 45 marks/dots across and 36 marks/dots down (i.e. 1620 marks/dots). The marks may be a light colour against a dark background or vice-versa.

Figure 3:
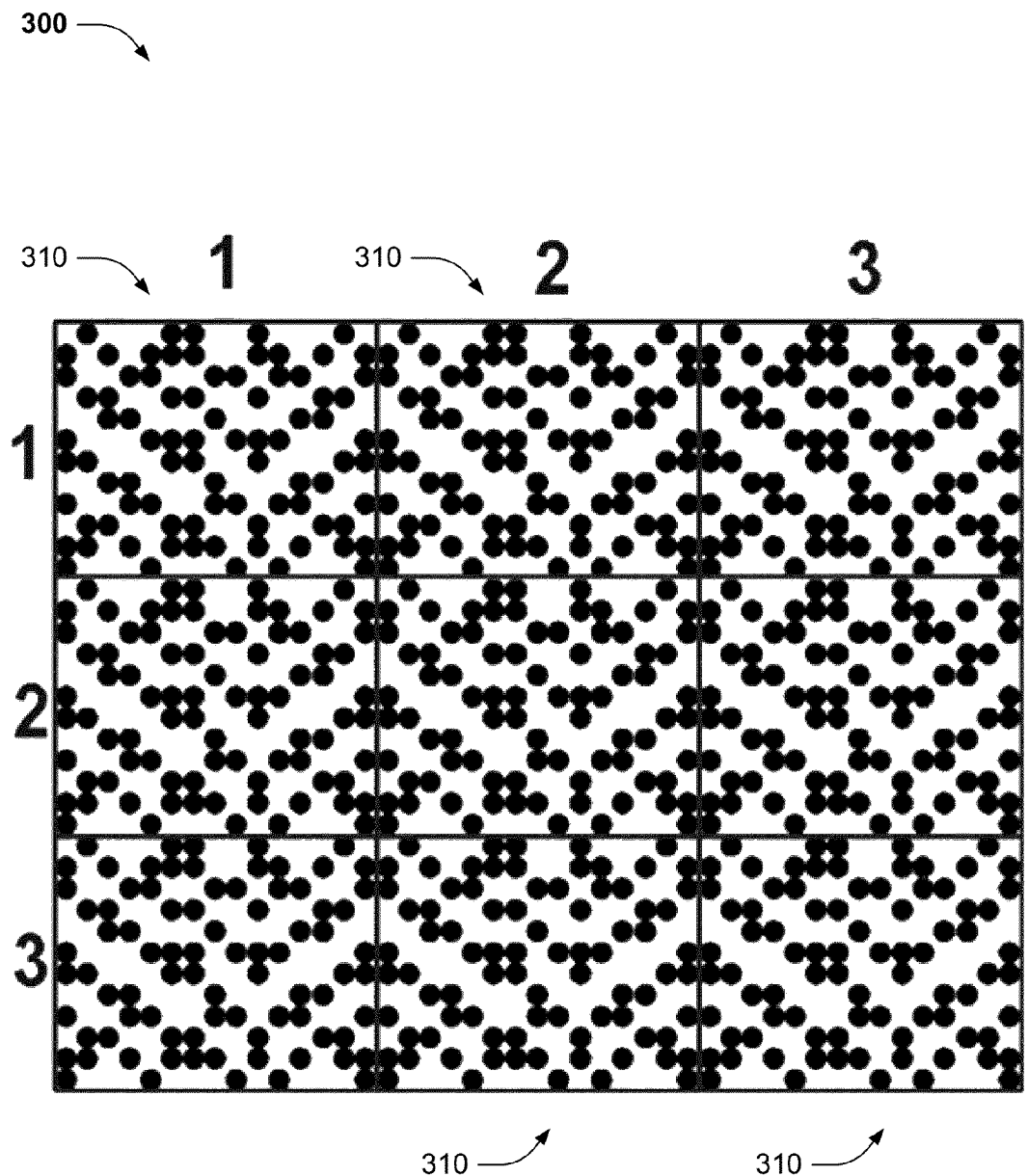
FIG. 3 is a schematic view of an embodiment tag element, shown comprising nine identical arrays disposed three across and three down.

FIG. 3 shows an example embodiment tag element 300 comprising 9 identical arrays 310. When being read by the reader, the 9 identical arrays are, in a virtual sense, overlaid, one on top of the other.

Figure 4:
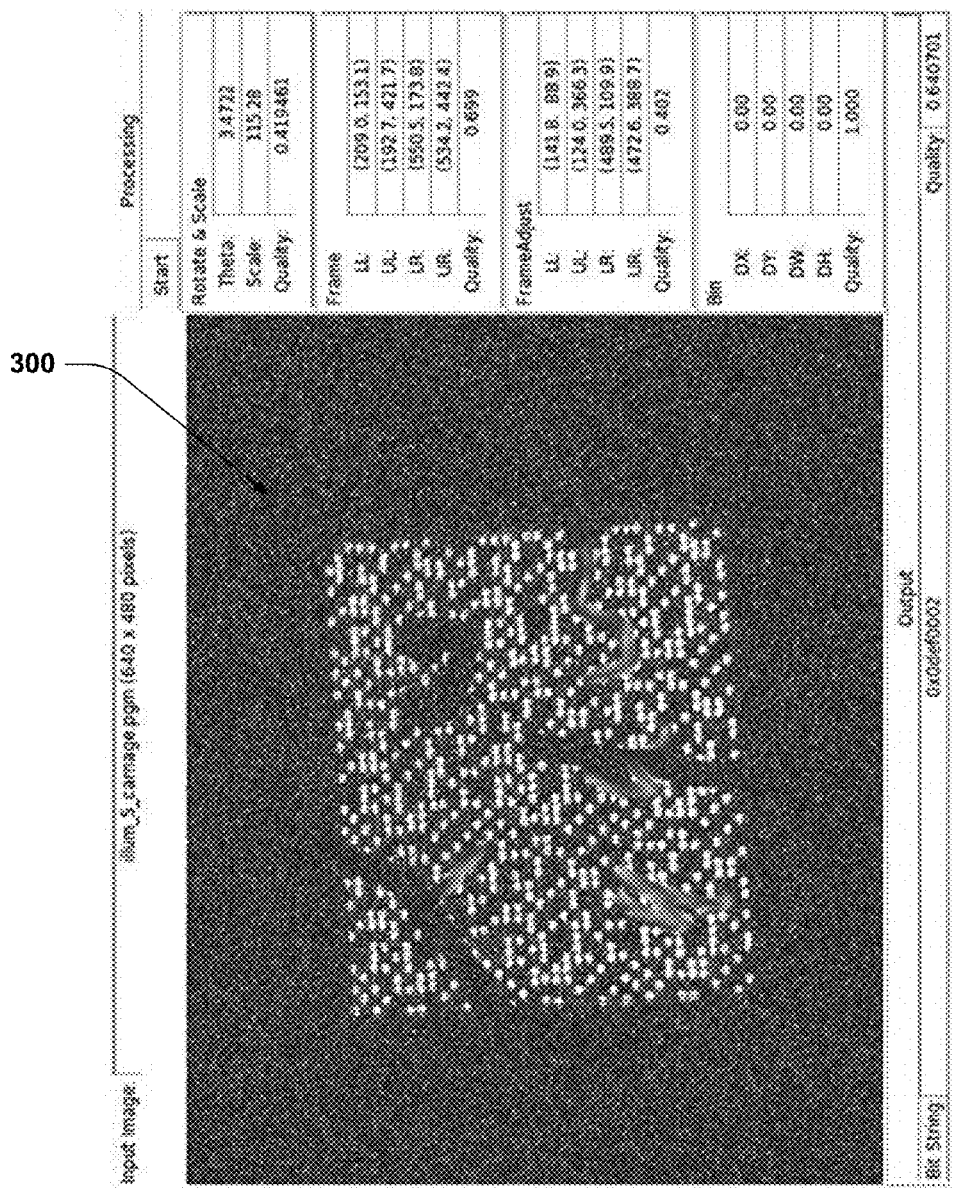
FIG. 4 is a schematic view of an embodiment tag element, shown damaged but readable.

FIG. 4 illustrates an example tag 400 that has been damaged, but which can be read. Where a mark/dot has been damaged by abrasion or by dirt, the other 8 dots from a duplicate array can "win out" and the reader can calculate the number associate with the tag. This level of redundancy has been found to provide significant resistance against damage and dirt.

Figure 5:
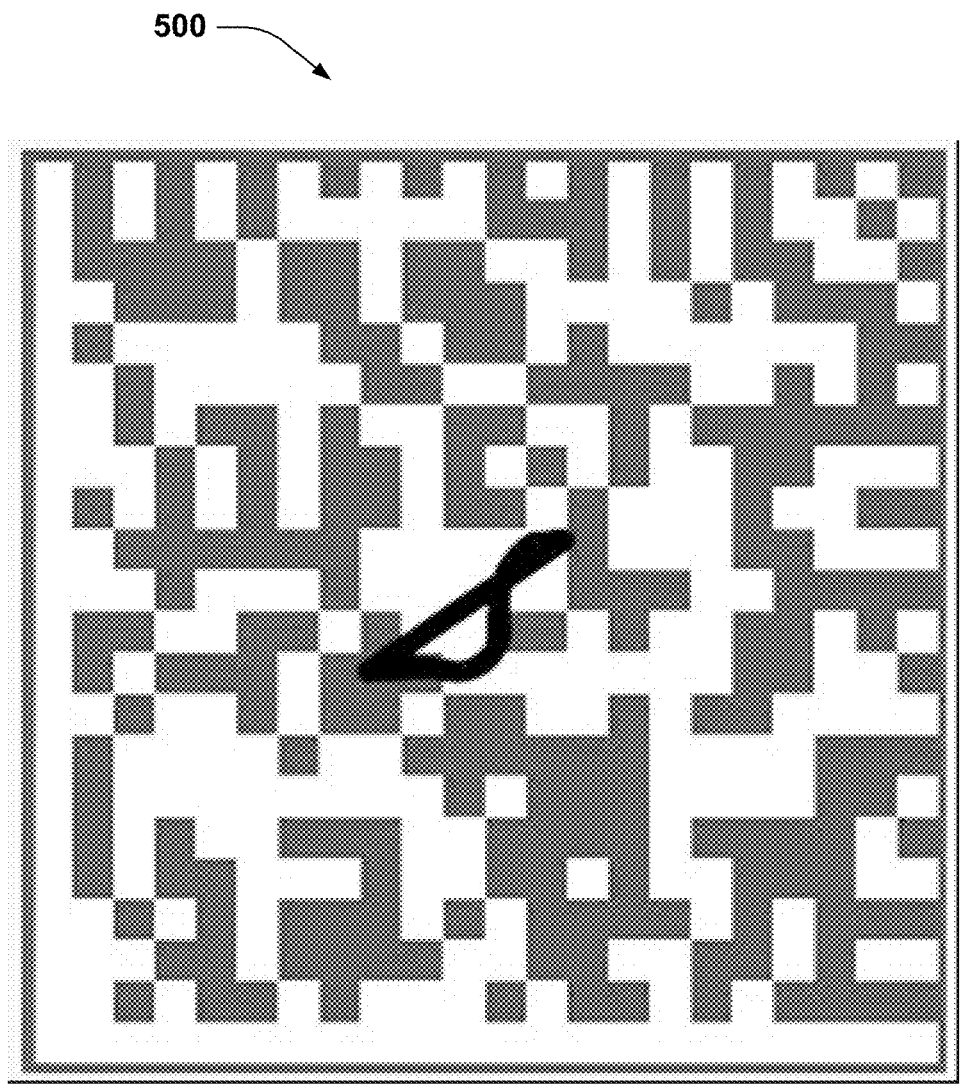
FIG. 5 is a schematic view of an alternative "DataMatrix" tag element, shown slightly damaged but unreadable.

By way of contrast, FIG. 5 shows a tag 500, (utilising another popular 2D barcode symbology called DataMatrix, which has been damaged by a small pen-stroke, and is no longer readable.

Figure 6:
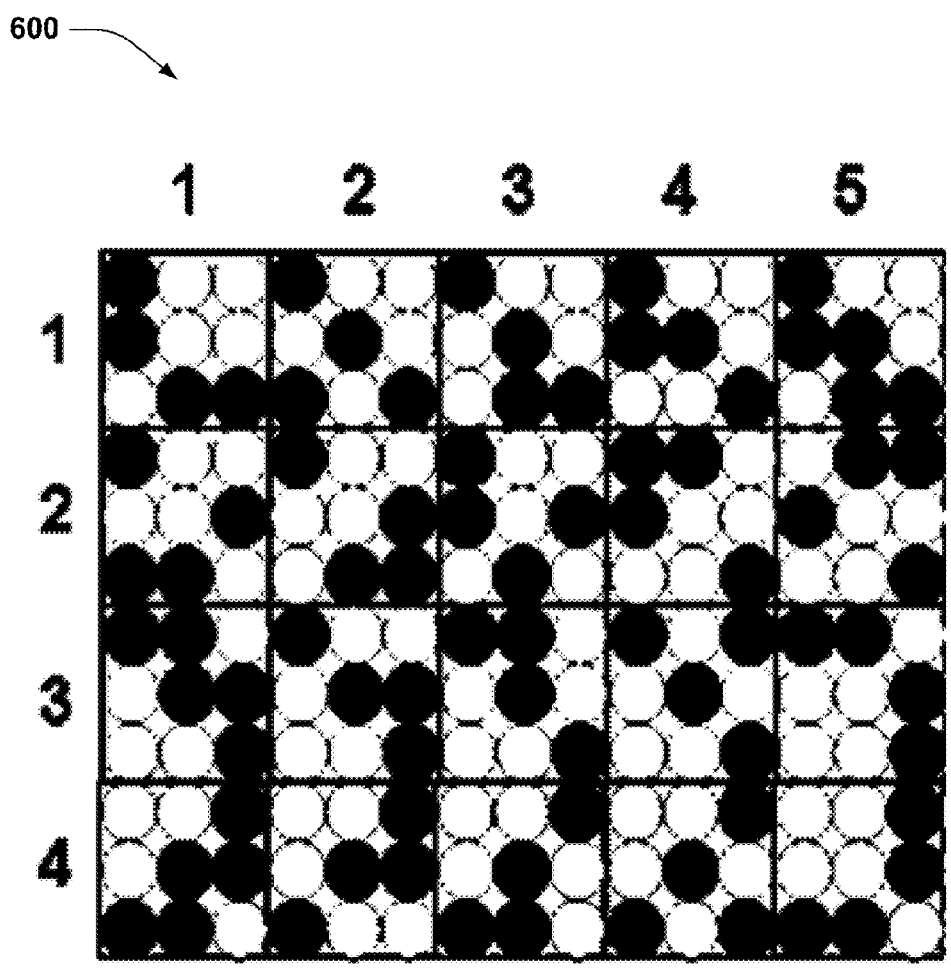
FIG. 6 is a schematic view of an array associated with a tag element, shown indicative of an arrangement of clusters.
Figure 7:
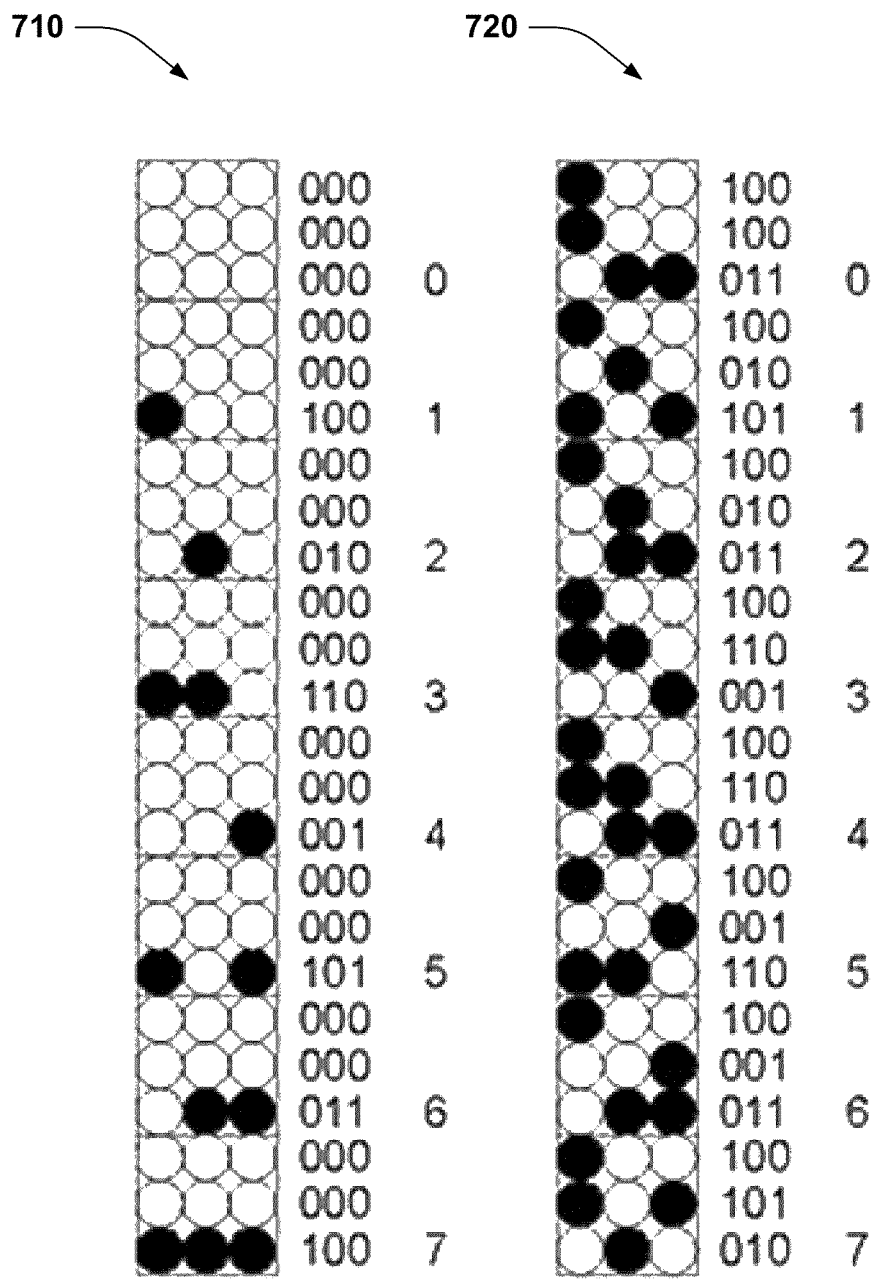
FIG. 7 shows two tables, each representing an alternative structure for a cluster to represent binary numbers using a series of marks/dots.

FIG. 6, shows each array is made up of 20 clusters of 9 dots; each cluster being arranged in what is effectively a "sub-array" of 3 by 3 dots. By way of example, FIG. 7 presents a table 720, showing arrangement of marks/dots representing a numeral 0-7, such that three marks/dots are not arranged horizontally or vertically within a cluster. It will be appreciated that the choice of symbol representation of values depicted achieves a relatively high degree of "randomness"/low correlation between clusters but also can assist in the detection of a tag in the field of view because patterns complying to rules such as this do not typically occur in nature.

It will be appreciated that by using dots, any one or more of the following advantages can be achieved:
it is possible to make a smaller dot with a low resolution printing or etching device than it is possible to make a square or rectangle mark;
a tag comprised of dots can be made smaller with lower grade/cheaper machinery.
it is possible to simplify a laser-etching system, such that it becomes affordable by small business. Laser-etching, as described herein, is seen as being a beneficial means of creating the NU-ERA or modified DataMatrix barcode symbology on a tag or directly onto the surface of objects.

The numerical value represented by a tag can be encrypted utilising known methods, including Open Source Software algorithms. Encryption can be used to restrict persons or organisations from generating their own set of valid numbers. Instead, under this arrangement valid numbers can only be obtained from a central registry thereby ensuring that all numbers represented by the NU-ERA tag are unique.

Figure 8:
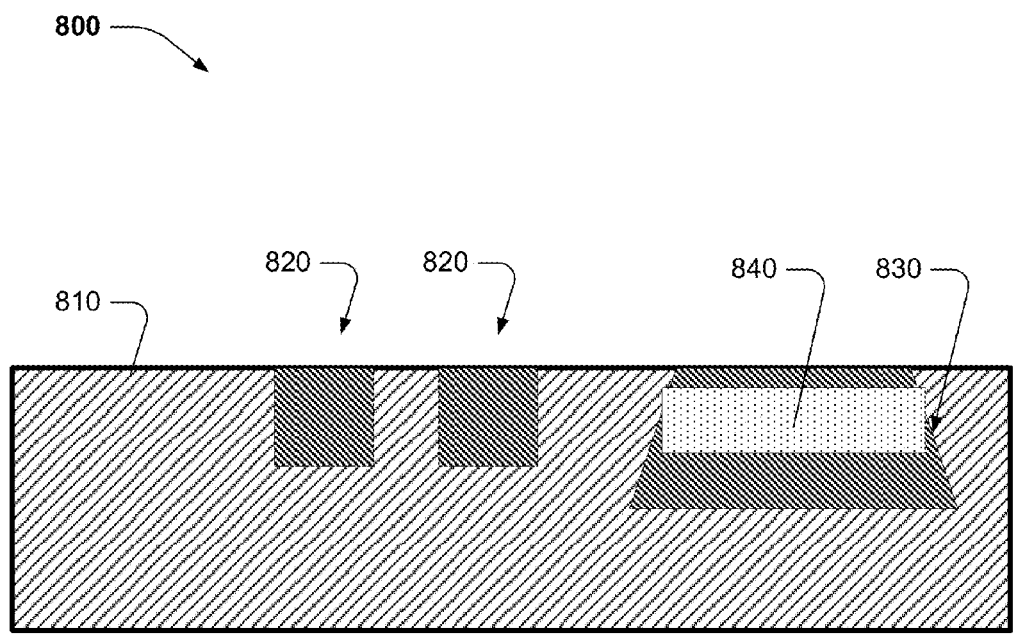
FIG. 8 is a schematic cross-section view of an embodiment of partial tag elements etched into the surface of an item.

FIG. 8 shows a cross-sectional view of an embodiment tag 800 that has been etched into the surface of an item 810. The etching, by way of example only, typically includes a divot 820 with substantially vertical sides or it can include an undercut divot 830. An undercut divot can be used for the purposes of assisting retention of the ink or glue (for example 840) used to fill the divot under conditions of shock, flexing and vibration. In an example embodiment, the filling may comprise a multi-layered structure, wherein one layer could be an interface layer to provide adhesion, a second layer could be a "binder" that holds a fluorescent compound, a third layer could be a protective layer of a wear resistant substance such as urethane.

Reader Module

Figure 9:
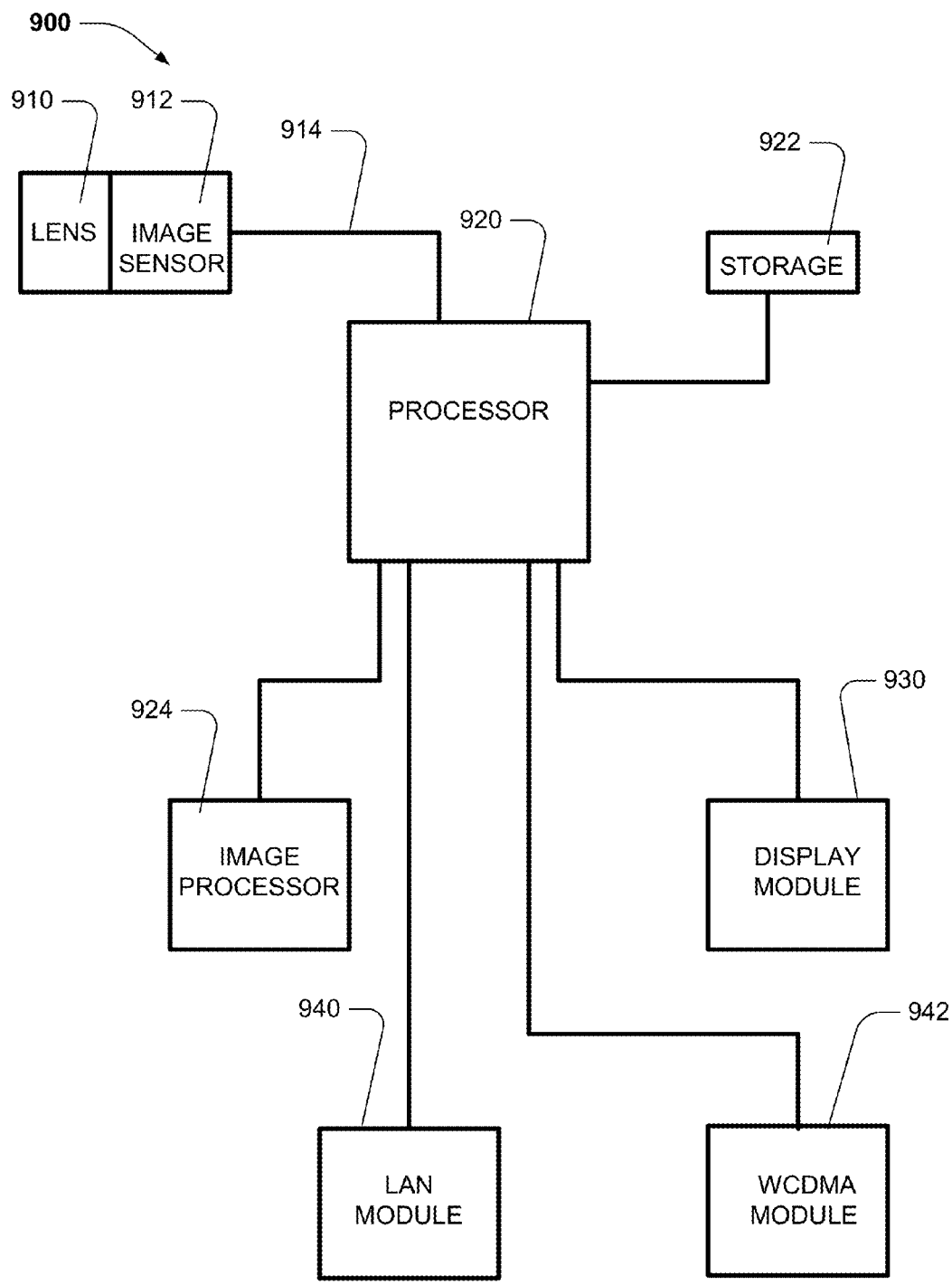
FIG. 9 is a schematic view of an embodiment reader module.

FIG. 9 shows an example embodiment of a reader module 900 utilising an image sensor such as a CCD chip. In this embodiment, the tag (not shown) is illuminated by the reader, the illumination means usually being integrated into a lens housing 910.

Typically, the illumination radiation is centred in either the visual or the UV spectrum. The lens system has a variable focus and zoom capability, so as to present a tag with clarity and in the correct proportions. The lens arrangement (or assembly) can also include an auto-aperture system to enable appropriate exposure for the image sensor 912, preferably across a wide range of lighting conditions. The digital result of this image communicated by some communications means 914 (for example USB) to a processor 920. The processor is operatively associated with dynamic memory or other storage device 922, for processing by the image processor 924 and general software running on the main system board. The processor 290 can be coupled to a display module 930, and one or more communication modules (for example including a wireless LAN module 940 or WCDMA module 942).

In an embodiment, by way of example only, processing can occur in a plurality of stages, for example, each stage taking 5 milliseconds to complete. For example, 3 stages consisting of orientation, scaling and extraction of the tag's value) may require a total time of about 15 milliseconds. However, the system may take a new "frame" every 5 milliseconds. This processing can include any one or more of the following:
  locate the presence of a tag within the field of view
  orientate the image of the tag;
  manipulate the image so that the tag is rectangular and of the correct aspect ratio
  scale the tag so that the distance between the dots can be properly judged;
  calculate the value of the clusters comprising the 9 arrays;
  calculate the total value of each array made up by the clusters and decrypt each value with each array, being "flipped" if it doesn't provide a valid value in its original orientation; and
  if a valid value can not be found in any single array of clusters after "flipping", overlay the arrays in a variety of combinations in order to see if it is possible to arrive at a valid value when decrypted.

It will be appreciated that, with error checking and encryption, it is possible to try many different orientations until one returns a valid result. Although this approach can increases the processing overhead, it can provides considerable simplification in regard to tag geometry and flexibility of tag use. With relatively high speed processing and storage/memory, it can be possible to process images at a substantial frames rate (for example, 200 frames per second). This can provide a relatively prompt identification of the tag when, for example, an item is being swiped through a checkout, and can also enable use of an focusing system, as described herein.

To enable a tag to be relatively small, magnification is required, which can cause a problem with focus and the steadiness of the person holding the reader. These problems can be overcome by using a relatively high frame rate, and adapting a focus mechanism to continuously cycle focus between long and short focal distances. In this manner, it can be expected that one or more of the frames will present an image that is sufficient for the image processing circuitry to decipher. The error checking and the encryption algorithm can inform the process that a correct deciphering of the tag has occurred.

Figure 10:
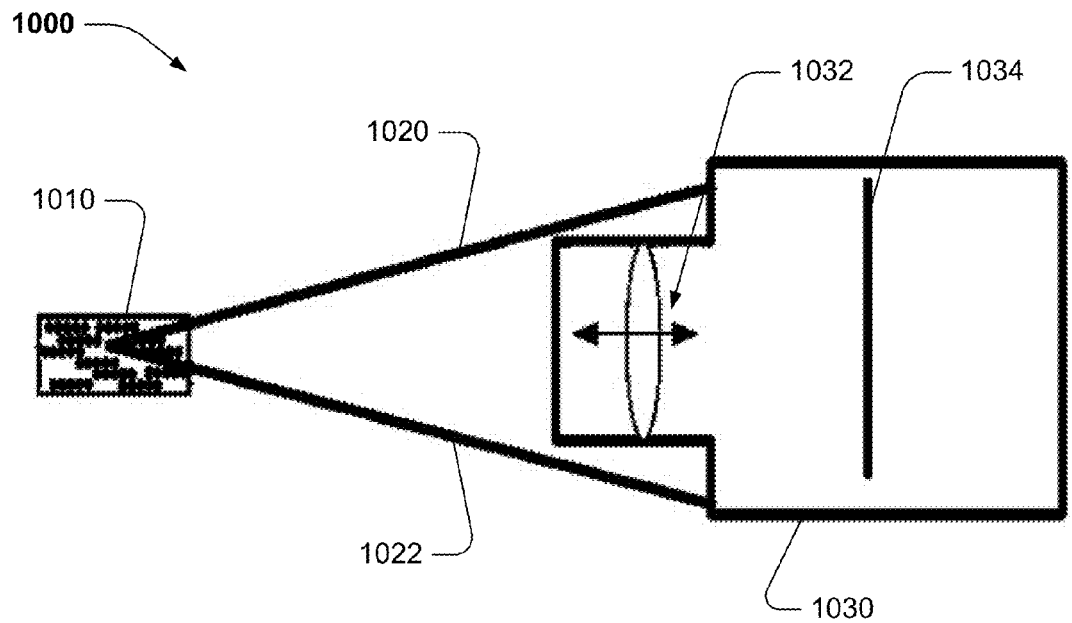
FIG. 10 is schematic view of an embodiment reader module, illustrating a method of focusing on a tag.

FIG. 10 shows an example embodiment reader apparatus 1000. In this embodiment, the tag 1010 is illuminated by two convergent beams of light 1020 and 1022 (for example, produced by lasers). The beams may be of different colours, eg, red and blue. When the beams form one dot or close to one dot, the reader 1030 is a set distance from the tag. If necessary, to make the reader more flexible, in terms of the distances tags can be read from, the angle of convergence of the beams can be adaptively set/adjusted by way of electrical or mechanical controllers. The adaptive adjustment can be further coupled to an auto-focusing mechanism. For example, if the an auto-focus mechanism adjusts a lens 1032 to a longer focal length, the angle of convergence can be adjusted to a lower angle. Zoom/magnification of the lens can be adjusted such that the read distance can increased, corresponding to an increase in focus distance. The function of the beams is to indicate the reader is held at a distance to which the focus is approximately adjusted and to provide a clear illuminated image to the image sensor 1034.

Typically, it is preferred that a read process occur in less that half a second. If the frame capture rate is 200 frames per second, during the half second there will have been 100 frames captured. When the user operates a reader the focus cycles on either side of what the auto-focus believes is the distance to the tag. A consequences of this is that some of the frames extracted, will be sufficiently sharp when captured by the image sensor 350 to render a valid value by the processing module/circuitry. For example, if the reader is held at a distance of 150 mm from the tag and the focus cycles between 100 mm and 200 mm, a difference of 100 mm, in half a second (@ 200 frames per second, there will be 100 frames captured in half a second) then there will be 1 mm difference in focal length between each of the frames.

Figure 11:
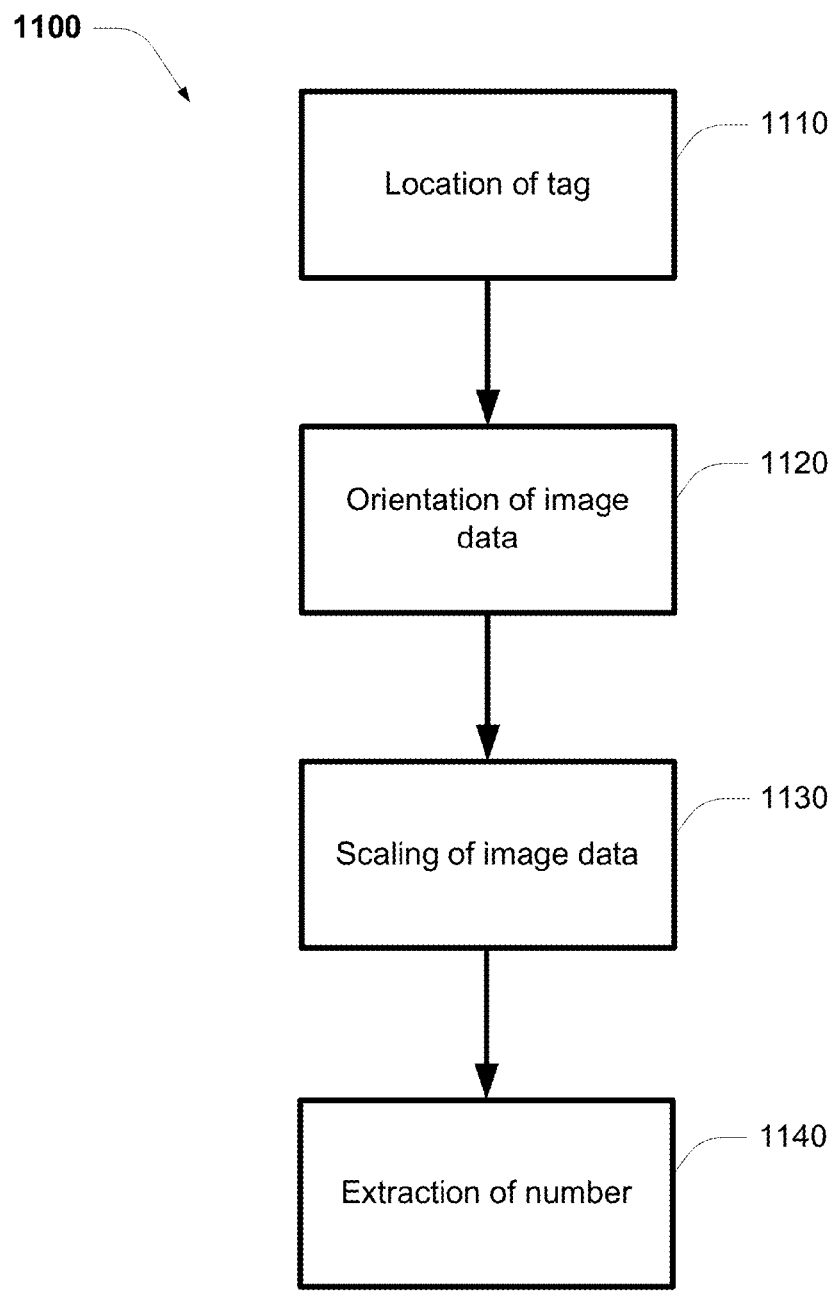
FIG. 11 is a flowchart for an embodiment method of reading a tag.

FIG. 11 shows a flowchart for an embodiment method of reading a tag. The zone image is recovered and converted to a 128-bit number (the Tag Number) by the Reader electronics. The digital image processing typically consists of a cascade of four functions. The method comprising the steps of:
  STEP 1110 location of the tag within image data;
  STEP 1120 orientation of image data;
  STEP 1130 scaling of image data; and
  STEP 1140 extraction of number associated with the tag.

Two algorithms employed in the reading of a tag from an image include:
  an Image Processing algorithm for providing a bit string associated with a captured image; and
  an Decryption and Validation algorithm which operates on the bit string to recover the tag ID The following describes the workings and implementation of those algorithms in detail.

The Image Processing algorithm analyses image data containing a tag, identifies the symbols, and extracts a tag bit string from the arrangement of dots and spaces.

Figure 12:
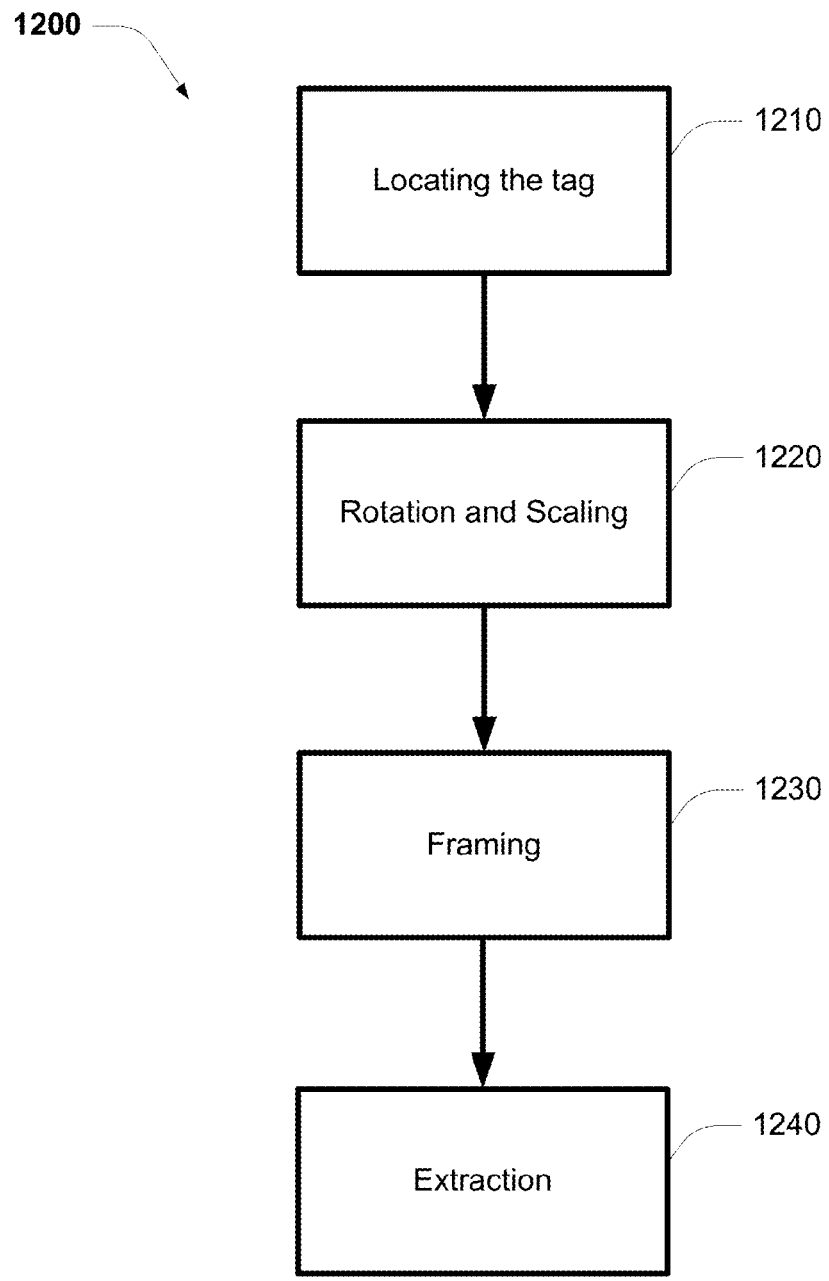
FIG. 12 is a flowchart for an embodiment method of an image processing algorithm.

Referring to FIG. 12, method steps 1200 associated with the Image Processing algorithm include:
  STEP 1210 locating the tag in the image;
  STEP 1220 rotation and scaling;
  STEP 1230 framing; and
  STEP 1240 extraction.

The image processing algorithm extracts a bit string from the pattern of dots in the image. The self-similarity and redundancy property of the repeated array image is used to eliminate the need for fiducial marks or borders.

A correlation function can be used to locating a tag (as herein described) in the image. The correlation operation is illustrated diagrammatically in FIG. 13A though FIG. 13D.

The following code fragment defines the correlation function in pseudo-code:

```
total := 0.0;
for x in 0 to n_x_points - 1 loop
    for y in -n_y_points + 1 to n_y_points - 1 loop
        pv1 := get_pixel(cx + x * cos_theta - y * sin_theta,
                cy + x * sin_theta + y * cos_theta);
        pv2 := get_pixel(cx + x * cos_theta - y * sin_theta +
                size * cos_theta,
                cy + x * sin_theta + y * cos_theta + size * sin_theta);
        total := total + pv1 * pv2;
    end loop
end loop
```

Figure 14:
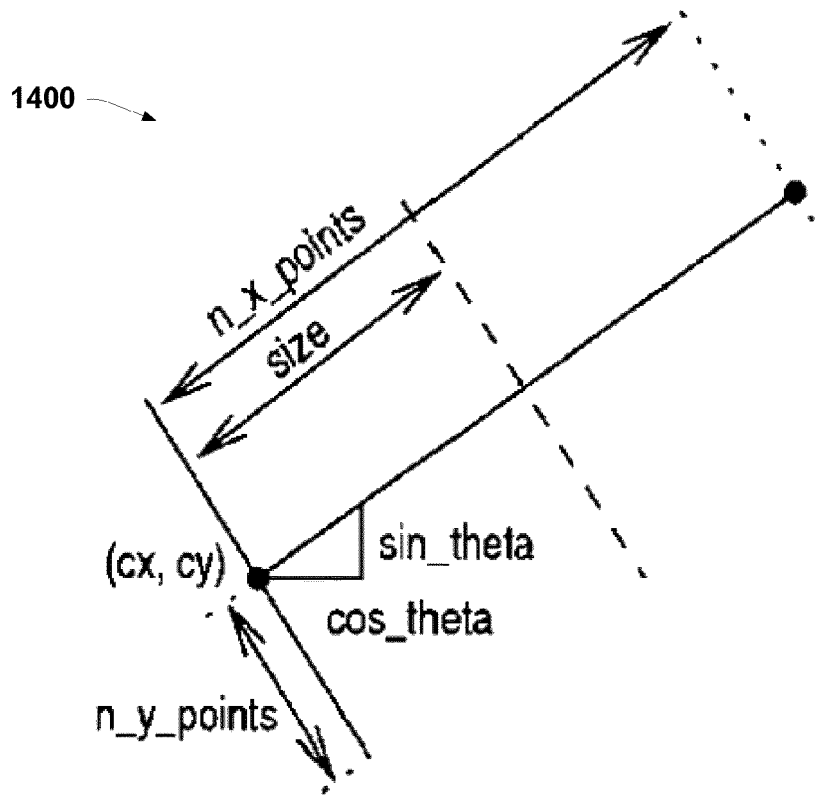
FIG. 14 is a graphical representation indicative of the geometry associated with the correlation function.

The following Table describes the function parameters, and FIG. 14 illustrates the geometry associated with the correlation function.

TABLE 1

| Parameter Name | Description |
| --- | --- |
| cx | x-coordinate of starting point for centre spine of 2d correlation |
| cy | y-coordinate of starting point of centre spine of 2d correlation |
| size | separation between samples in terms of the step vector (cos_theta, sin_theta) |
| cos_theta | x-component of step vector |
| sin_theta | y-component of step vector |
| n_x_points | number of steps performed in the direction of the step vector |
| n_y_points | number of samples used in each direction orthogonal to the step vector |

An approximate location of the centre of a tag is determined. The location of the centre of the tag is determined by computing a correlation function at a sequence of points in the image. The results of the correlation operations are combined to calculate a centre location. An algorithm for computing a correlation function includes:

generating a grid reference of points over the image;
for each point (x, y) in the grid, we perform a correlation function over size and rotation angle theta, for determining a tag position and orientation;
performing a correlation at the same position, and angle, but at a different size (for example, 0.35× the original size);
comparing correlation results, wherein a tag at a location typically produces a high result for the first correlation, and a low result for the second—defining a high weighting factor, wherein no tag typically provides a high or low correlation value, and the same for the second correlation value—defining a low weighting factor;
uUsing the correlation function value and associated weighting factor for each points (x, y), a centroid (mx, my) can be computed, which approximates the centre of the location of the tag in the image.
if substantially all weighting factors are too low, then this is indicative that an identifiable tag is unlikely to be in the image.

In computing rotation and scaling, a correlation function is calculated with parameters theta (typically cos_theta and sin_theta, being the cosine and sine of the angle theta respectively), and size are swept across a range of values. The correlations are computed at a location corresponding to the computed approximate centre of the tag in the image. The theta and size corresponding to a maximum correlation function is identified. To reduce execution time, an iterative operation can commence with a relatively large step size and range for both theta and size, and successive reduced range and step until theta and size are identified to an acceptable resolution.

In an embodiment, a correlation function is computed for theta over the range 20° to +20°, with an initial step of 0.25°, and size from 110 to 190 pixels with an initial step of 0.5. At each pass, the theta step is reduced by a factor of 3, and the size step by a factor of 4. The other parameters to the correlation function are typically fixed for the whole sweep.

n_x_points is 4, and
n_y_points is ⅓ of the height of the image.

The result of this method step is a tuple corresponding to a maximum correlation function, including:

quality, which is the normalised correlation function value (1.0=>perfect correlation, 0.0=>no correlation);
the cos_theta and sin_theta of the rotation angle, and;
the scale/size.

Framing of the tag within a frame image can be computed. There are two methods for performing coarse determination of the frame of the tag image. The method used depends on the success of the prior processing steps, and thereby can influence the amount of time used in subsequent steps.

Peak Framing is typically used if the centroid of a tag in an image has not been accurately located. This algorithm/method can use a centre coordinate which can be quite inaccurate, and locates the edges of the tag image (typically to within a few pixels). However, it is noted that this method typically requires a relatively clear/sharp tag image, and is sensitive to defects on the tag edge. The following table contains a description of the parameters for this method.

| Parameter Name | Description |
| --- | --- |
| cx | xcoordinate of centre of tag in image |
| cy | ycoordinate of centre of tag in image |
| cos_theta | cosine of rotation angle of tag in image |
| sin_theta | sine of rotation angle of tag in image |
| scale | size of one "rep" of tag in the xdirection (therefore, the full tag is 3 * scale pixels wide) |
| tag_xbits | number of dots in one rep of the tag in the xdirection. For a type 96 tag with 5 × 4 symbols using 3 × 3 transport coding, this is 15 dots |
| tag_ybits | number of dots in one rep of the tag in the ydirection. For a type 96 tag with 5 × 4 symbols using 3 × 3 transport coding, this is 12 dots |
| viz, r_viz | objects for graphical visualization of the algorithm in real time. Use None for normal operation. |

Figure 15:
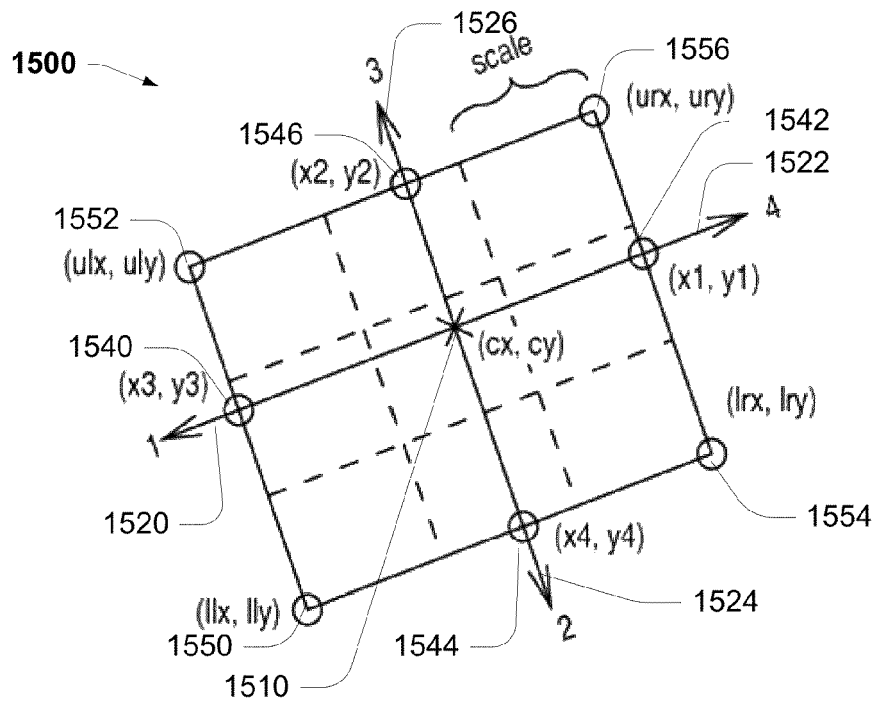
FIG. 15 is a graphical representation indicative of coarse framing undertaken by reader processing logic.
Figure 16:
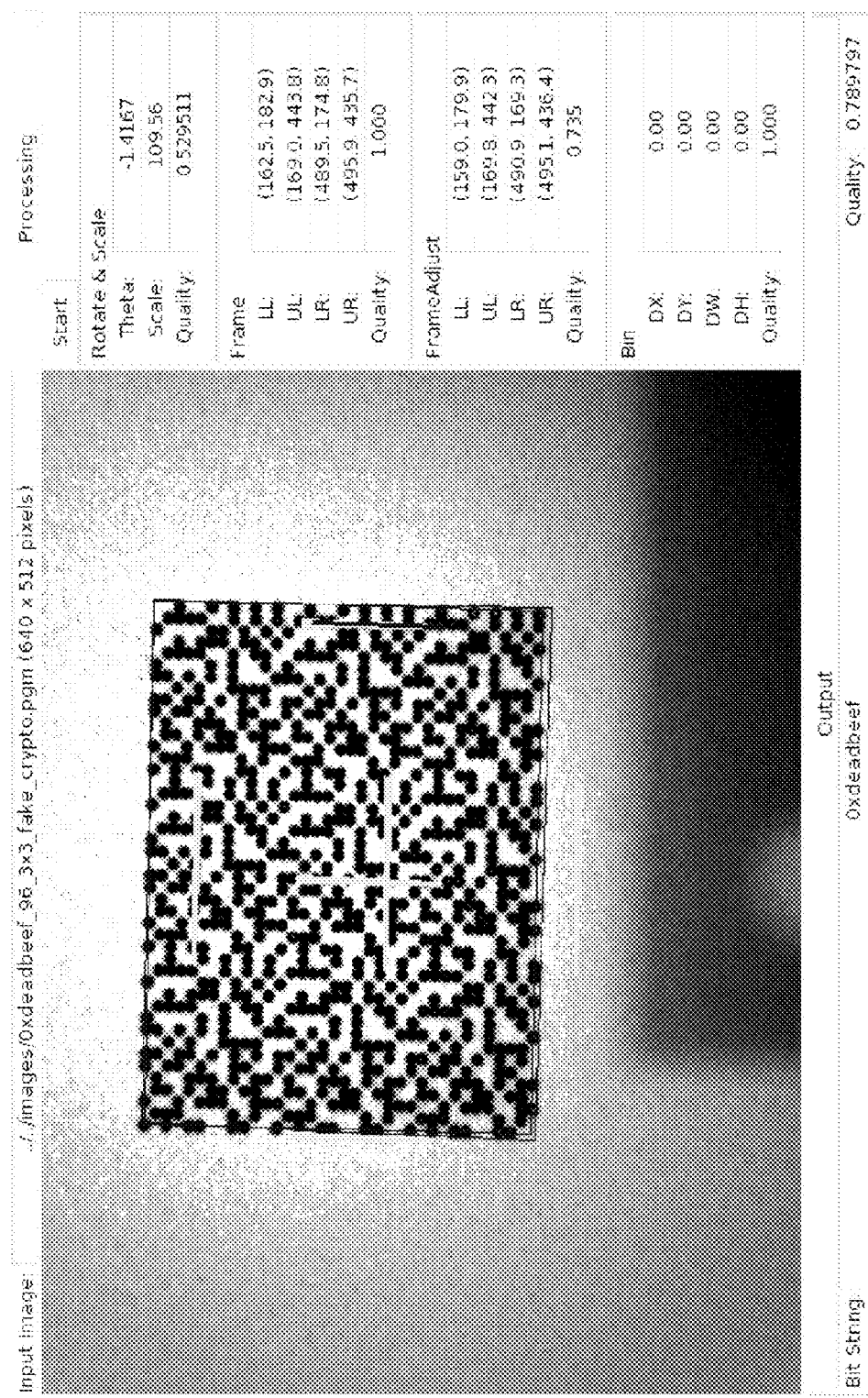
FIG. 16 shows graphical results calculated in respect of the tag location, framing and extraction/decryption process.

The algorithm computes the tag edge positions along 4 lines, as best illustrated FIG. 15. In this example, location (cx, cy) 1510 is not at the centre of the tag, which is typical when the centroid has not been accurately determined.

For a point that sweeps out from (cx, cy) along each line 1520 and line 1522, a series of correlations is performed using size=scale, n_x_points=2*scale, and cos_theta and sin_theta in the back towards (cx, cy). Taking line 1520 as a specific example, it will be seen that as the point reaches (x3, y3) 1540, the correlation is maximised. Similarly, for line 1522, the correlation is maximised at point (x1, y1) 1542.

Processing is similar for lines 1524 and 1526, only here size=scale*n_ypoints/n_xpoints and n_x_points=2*scale*n_ypoints/n_xpoints.

The algorithm calculates/identifies the maximum value of the series of correlations, thereby locating points (x1, y1), (x2, y2), (x3, y3) and (x4, y4).

Given those 4 points, along with (cx, cy), the corner coordinates (llx, lly) 1550, (ulx, uly) 1552, (lrx, lry) 1554, and (urx, ury) 1556 can be calculated.

For each line, a quality factor is determined. This is the normalized value of the correlation function. The four quality factors are averaged to give an overall quality factor, which can be used to determine whether (or not) the framing has worked.

Centre Framing is typically used when a tag image has been reasonably accurately located within the image data. This method has: the advantage that it is relatively quick; but the disadvantage that it locates the edges with the same uncertainty associated with the centroid location. This may require further time to be spent in a subsequent frame adjustment phase. The parameters of the method are as for the peak framing method.

The centre framing method assumes receipt of a centroid of the tag in the image (cx, cy), that has been located sufficiently accurately, and its orientation (size, theta) has been determined. In an example, simple geometry can enable the coordinates of the corners to be calculated as follows:

$h$scale=size $v$scale=size×tag_$y$bits/tag_$x$bits cos_theta=cos(theta)

sin_theta=sin(theta)

then $dx1 = h\text{scale} \times 1.5 \times \text{cos\_theta}$, $dy1 = h\text{scale} \times 1.5 \times \text{sin\_theta}$, $dx2 = v\text{scale} \times 1.5 \times \text{sin\_theta}$, $dy2 = v\text{scale} \times 1.5 \times \text{cos\_theta}$, $urx = cx + dx1 + dx2$ $ury = cy + dy1 + dy2$ $lrx = cx + dx1\, dx2$ $lry = cy + dy1\, dy2$ $llx = cx\, dx1\, dx2$ $lly = cy\, dy1\, dy2$ $ulx = cx\, dx1 + dx2$ $uly = cy\, dy1 + dy2$ A coarse framing phase locates a frame around the tag image within the image data. The accuracy depends on the method used and the quality of the image.

Fine frame adjustment is required to refine the frame location to the point where extraction can be calculated.

Methods parameters associated with fine adjustment are set out in the following table.

| Parameter Name | Description |
|---|---|
| scale | Size of one "repetition" of tag in the x direction (therefore, the full tag is 3 * scale pixels wide) |
| cos_theta | Cosine of rotation angle of tag in image |
| sin_theta | Sine of rotation angle of tag in image |
| llx, lly, lrx, lry, ulx, uly, urx, ury | Coordinates of the frame corners. |
| tag_xbits | Number of dots in one rep of the tag in the xdirection. For a type 96 tag with 5 × 4 symbols using 3 × 3 transport coding, this is 15 dots |
| tag_ybits | Number of dots in one rep of the tag in the ydirection. For a type 96 tag with 5 × 4 symbols using 3 × 3 transport coding, this is 12 dots |
| tag_nreps | Number of repetitions in the tag. For most purposes, this is 3. |
| viz | Object for graphical visualization of the algorithm in real time. Use None for normal operation. |

In an embodiment, by way of example only, the algorithm used is a "greedy" random search around the vicinity of the starting points determined by the coarse frame stage. The size of the search step is reduced in an exponential decay, similar to a search by simulated annealing. It will be appreciated that other minimisation techniques can be used. At regular periods in the decay, there is a trial of shifting the search frame by one "dot" width in all 8 compass directions (N, NE, E, SE, S, . . . , etc). This method evaluates a "goodness" fit of the frame using the current corner coordinates. It firstly performs point sampling for the tag bits, with consideration of the number of dots across and down, and the number of repetitions in the tag. This results in a vector of pixel values. These values are averaged, and then the average is subtracted from each value, and the mean square (MS) sum is calculated. The random search proceeds by taking the current frame and considering a nearby frame where a number of the coordinates of the current frame are moved by a delta which is proportional to the search step size. If the nearby frame being considered has an increased fitness function value, it is selected in preference to the current frame. A number of trials are performed at the prevailing search step size value, then the step value is reduced according to an exponential decay. If the fitness function exceeds a local threshold, then the next step is performed without going through the full number of trials. If the fitness function exceeds a global threshold, the search is terminated.

It will be appreciated that, because of redundancy in the tag, and because the fitness function only considers sample values (it does not decode them), it is possible for a tag on a solid background to have a high fitness function value when the frame is misaligned by an integer multiple of dots in the x or y directions. This represents a local maximum which can prevent the greedy search from finding the global maximum. In order to jump out of this, at regular intervals, alternative frames are considered that are moved by one dot in each of the 8 possible compass directions. If one of these alternatives gives a better fitness function value, it is adopted as the current frame. Once the defined number of trials has been performed, or if the fitness function value is above the global threshold, the current frame is returned as the fine frame, along with the fitness function value as a quality metric.

Extraction of the value represented by the symbols contained in a tag is calculated.

Method's parameters associated with extraction are set out in the following table.

TABLE 2

| Parameter Name | Description |
|---|---|
| scale | Size of one repetition of tag in the xdirection (therefore, the full tag is 3 * scale pixels wide) |
| llx, lly, lrx, lry, ulx, uly, urx, ury | Coordinates of the frame corners. See FIG. 5 for the arrangement. |
| tag_xbits | Number of dots in one rep of the tag in the xdirection. For a type 96 tag with 5 × 4 symbols using 3 × 3 transport coding, this is 15 dots |
| tag_ybits | Number of dots in one rep of the tag in the y direction. For a type 96 tag with 5 × 4 symbols using 3 × 3 transport coding, this is 12 dots |
| tag_nreps | Number of repetitions in the tag. For most purposes, this is 3. |
| viz | Object for graphical visualization of the algorithm in real time. Use None for normal operation. |

In an embodiment, this method can use the same pixel sampling as the fine framing procedure, considers the tag as consisting of a number dots in a 2D array, repeated in a 2D array. The coordinates represent the corners of the bounding quadrilateral of the tag. In an example embodiment where the tag with a 96 bit payload, and there are 9 repetitions (3 across, and 3 down). Therefore, for each dot, there are 9 repeated sample values. The procedure can divide the quadrilateral defined by the frame linearly into 1620 sample points (3×15 across, 3×12 down) using linear interpolation. It then "bins" the 9 repeated sample values for each dot and calculates the average. The output result is a vector of 180 raw sample values (one for each of the 15×12 dot positions). The 180 raw sample values can then be interpreted to extract a 96 bit tag code. Further details of decoding, decryption and validation are described herein. Given the raw samples, it is possible that there are errors arising from any one or more of the following:
 noise in the sample values (caused by dust, dirt, damage)
 tag alignment within the frame;
 tag orientation (for example, upside down)
 the image may be printed/engraved inverted (white on black)

Strategies may employed to handle possible errors, including any one or more of the following:
 a vector of raw samples can be converted into a "tlist" by simple "thresholding". Sample values close to 0.5 are probably a black dot, while those close to +0.5 are probably a white space. Those close to 0.0 may be either. By choosing the 5 values closes to 0.0 (i.e. the 5 most uncertain values) and considering the 32 alternative interpretations (where each sample could represent a 1 or a 0), we have a possibility of correctly recovering the tag code.
 The order of bits in the list assumes the first sample corresponds to the lower left corner of the first symbol block. If the frame is out by one row or one column (or both), the order will be incorrect. However, by scrambling the order of bits, we can compensate for this.
 If the tag is imaged upsidedown, then the list will consist of the reversed order of the expected bits. This is simply compensated for by trying the forward and reversed order bit list.
 If the tag was printed or engraved with light dots on a dark background, then the bits in the list will be inverted white for black.

The above four procedures listed above result in 32*9*2*2=1152 possibilities. While this is a significant number of possibilities, the transport coding scheme allows quick reject of gross errors. If the transport code is valid, then it is quite likely that the code is itself correct.

A Decryption and Validation method/algorithm receives a tag bit string produced from the image processing algorithm, and converts it to a tag ID. The Decryption and Validation algorithm can comprise the steps of:
 transport
 decryption
 validation The Decryption and Validation algorithm recovers the tag ID (where possible) by operating on the bit string produced by the Image Processing algorithm. Further details of the Decryption and Validation method are described herein.

A tag ID, by way of example only, is represented as a 2D array of dots in a dPId NU-ERA tag as follows:
 The tag ID is referred to the icode. The size of the icode is 96 bits. The icode is accompanied by a 32 bit validation code (vcode). The combined icode and vcode is called the payload code (pcode).
 The pcode is encoded into a string of symbols. An alphabet of 100 symbols is used in the specific tag representation.
 The symbols are mapped 1 to 1 onto transport codes (tcode) for representation on the physical medium.
 The arrangement of tcode on the medium is as a 2D array. The bits in that array can also be represented as a 1D vector (tlist).
 The tag image has a number of repetitions (across, and down). In the case of the 96 tag, this is 3x across and 3x down, for a total of 9 repetitions.

The Transport Code, or "tcode", represents a method whereby a cluster of 9 dots, arranged 3 across and 3 down represents a decimal numeric value ranging from 0 to 99. The following table provides, by way of example only, a complete list of cluster patterns (transport codes) representing the decimal values 0 to 99. The arrangement of the dots in a cluster has to follow the rule that three dots of the same colour cannot occur in the horizontal or the vertical. Referring to FIG. 7, the right hand column 720 provides the first 8 decimal values (0 to 7) represented as clusters of 3×3. For example, for the decimal value of 0, the first, second and third rows are 100, 100 and 011 respectively.

|  | Decimal Value | | | | | | | | | |
|---|---|---|---|---|---|---|---|---|---|---|
|  | 0 | 1 | 2 | 3 | 4 | 5 | 6 | 7 | 8 | 9 |
| 1st Row | 100 | 100 | 100 | 100 | 100 | 100 | 100 | 100 | 100 | 100 |
| 2nd Row | 100 | 010 | 010 | 110 | 110 | 001 | 001 | 101 | 101 | 011 |
| 3rd Row | 011 | 101 | 011 | 001 | 011 | 110 | 011 | 010 | 011 | 100 |

-continued

| | \ | \ | \ | \ | Decimal Value | \ | \ | \ | \ |
|---|---|---|---|---|---|---|---|---|---|
| | 10 | 11 | 12 | 13 | 14 | 15 | 16 | 17 | 18 | 19 |
| 1st Row | 100 | 100 | 100 | 100 | 100 | 010 | 010 | 010 | 010 | 010 |
| 2nd Row | 011 | 011 | 011 | 011 | 011 | 100 | 100 | 100 | 010 | 110 |
| 3rd Row | 010 | 110 | 001 | 101 | 011 | 001 | 101 | 011 | 101 | 001 |

| | \ | \ | \ | \ | Decimal Value | \ | \ | \ | \ |
|---|---|---|---|---|---|---|---|---|---|
| | 20 | 21 | 22 | 23 | 24 | 25 | 26 | 27 | 28 | 29 |
| 1st Row | 010 | 010 | 010 | 010 | 010 | 010 | 010 | 010 | 010 | 010 |
| 2nd Row | 110 | 001 | 001 | 001 | 101 | 101 | 101 | 101 | 101 | 101 |
| 3rd Row | 101 | 100 | 110 | 101 | 100 | 010 | 110 | 001 | 101 | 011 |

| | \ | \ | \ | \ | Decimal Value | \ | \ | \ | \ |
|---|---|---|---|---|---|---|---|---|---|
| | 30 | 31 | 32 | 33 | 34 | 35 | 36 | 37 | 38 | 39 |
| 1st Row | 010 | 010 | 110 | 110 | 110 | 110 | 110 | 110 | 110 | 110 |
| 2nd Row | 011 | 011 | 100 | 100 | 010 | 010 | 110 | 001 | 001 | 001 |
| 3rd Row | 100 | 101 | 001 | 011 | 001 | 101 | 001 | 100 | 010 | 110 |

| | \ | \ | \ | \ | Decimal Value | \ | \ | \ | \ |
|---|---|---|---|---|---|---|---|---|---|
| | 40 | 41 | 42 | 43 | 44 | 45 | 46 | 47 | 48 | 49 |
| 1st Row | 110 | 110 | 110 | 110 | 110 | 110 | 110 | 110 | 110 | 001 |
| 2nd Row | 001 | 001 | 001 | 101 | 101 | 101 | 011 | 011 | 011 | 100 |
| 3rd Row | 001 | 101 | 011 | 010 | 001 | 011 | 100 | 001 | 101 | 010 |

| | \ | \ | \ | \ | Decimal Value | \ | \ | \ | \ |
|---|---|---|---|---|---|---|---|---|---|
| | 50 | 51 | 52 | 53 | 54 | 55 | 56 | 57 | 58 | 59 |
| 1st Row | 001 | 001 | 001 | 001 | 001 | 001 | 001 | 001 | 001 | 001 |
| 2nd Row | 100 | 100 | 010 | 010 | 010 | 110 | 110 | 110 | 110 | 110 |
| 3rd Row | 110 | 011 | 100 | 110 | 101 | 100 | 010 | 110 | 001 | 101 |

| | \ | \ | \ | \ | Decimal Value | \ | \ | \ | \ |
|---|---|---|---|---|---|---|---|---|---|
| | 60 | 61 | 62 | 63 | 64 | 65 | 66 | 67 | 68 | 69 |
| 1st Row | 001 | 001 | 001 | 001 | 001 | 001 | 101 | 101 | 101 | 101 |
| 2nd Row | 110 | 001 | 101 | 101 | 011 | 011 | 100 | 100 | 010 | 010 |
| 3rd Row | 011 | 110 | 010 | 110 | 100 | 110 | 010 | 011 | 100 | 010 |

| | \ | \ | \ | \ | Decimal Value | \ | \ | \ | \ |
|---|---|---|---|---|---|---|---|---|---|
| | 70 | 71 | 72 | 73 | 74 | 75 | 76 | 77 | 78 | 79 |
| 1st Row | 101 | 101 | 101 | 101 | 101 | 101 | 101 | 101 | 101 | 101 |
| 2nd Row | 010 | 010 | 010 | 010 | 110 | 110 | 110 | 001 | 001 | 101 |
| 3rd Row | 110 | 001 | 101 | 011 | 010 | 001 | 011 | 010 | 110 | 010 |

| | \ | \ | \ | \ | Decimal Value | \ | \ | \ | \ |
|---|---|---|---|---|---|---|---|---|---|
| | 80 | 81 | 82 | 83 | 84 | 85 | 86 | 87 | 88 | 89 |
| 1st Row | 101 | 101 | 101 | 011 | 011 | 011 | 011 | 011 | 011 | 011 |
| 2nd Row | 011 | 011 | 011 | 100 | 100 | 100 | 100 | 100 | 100 | 010 |
| 3rd Row | 100 | 010 | 110 | 100 | 010 | 110 | 001 | 101 | 011 | 100 |

| | \ | \ | \ | \ | Decimal Value | \ | \ | \ | \ |
|---|---|---|---|---|---|---|---|---|---|
| | 90 | 91 | 92 | 93 | 94 | 95 | 96 | 97 | 98 | 99 |
| 1st Row | 011 | 011 | 011 | 011 | 011 | 011 | 011 | 011 | 011 | 011 |
| 2nd Row | 010 | 110 | 110 | 110 | 001 | 001 | 101 | 101 | 101 | 011 |
| 3rd Row | 101 | 100 | 001 | 101 | 100 | 110 | 100 | 010 | 110 | 100 |

The following describes in detail the subject of Transport Codes:

A tcode is derived from a pcode by translating the pcode into a string of symbols and then converting each symbol into a bit representation using transport coding. Using the transport coded symbols rather than using the symbols directly, provides an image produced with enough "transitions" to allow extraction of samples without the need for framing markers (also referred to as "fiducial marks").

The scheme used is a 2D generalisation of a concept called "group coding". In the case of the 96 bit tag, we derive a string of 20 symbols from an alphabet of 100 symbols. Each symbol is represented by a 9 bit transport code. The 9 bit transport code is drawn as 3×3 array of dots and spaces. The above table presents an example for a complete list of 9 bit representation of the decimal values ranging from 0 to 99.

By selecting the subset of 9 bit codes used, it is possible to ensure that no more than 2 consecutive dots or spaces in the horizontal or vertical can appear in a drawn symbol. The 96 bit tag uses a 3×3 transport.

Note that the transport coding implies a substantial amount of redundancy. There are 512 (=2^9) potential symbol codes in a 3×3 block, but only 100 are used as valid codes, so there is approximately 5x redundancy. This allows a quick initial check of the validity of an extracted tcode.

Tag Bit Lists is a 180 bit number formed from the concatenation of symbol transport codes. Further descriptions are presented below:

A symbol transport code consists of a "cluster" of 9 dots arranged in a 3×3 array.

An embodiment tag consists of 9 identical arrays, positioned 3 across and 3 down. Each array consists of 15 "points" or "dots" across and 12 "points" or "dots" down, making a total of 180 points that can either be the same colour as the background or a contrasting colour, eg, black dots on a white background or white dots on a black background.

The 15×12 array is further subdivided into "clusters" of 9 dots arranged 3 across and 3 down. These clusters comprise the transport codes wherein numerical values are represented by a particular pattern within the cluster. The pattern abides by the rule that 3 dots of the same type cannot exist either in the horizontal or the vertical direction. An array, being 15 dots across and 12 down, is made up of 5 clusters across and 4 clusters down.

The pcode is encrypted and a reader must decrypt the pcode before validating it. Enforcing this ensures that only tags using pcode issued from the registry are interpreted as valid tags.

By way of example only, an encryption method used for the 96 bit tag is the standard AES algorithm for 128 bit key and data block size. If elliptic curve encryption, that is asymmetric encryption, is used, then the number must be 256 bits, not 128 bits as 128 bits does not provide sufficient security. A reader implements only the decryption half of the AES algorithm. The encryption key is typically maintained/used is a secret. Symmetric and/or Asymmetric encryption method may be used.

The encrypted pcode is a 128 bit number with no structure. The decrypted pcode is a 128 bit number that is made up of a 32 bit validation code field (vcode) and a 96 bit input code field (icode). The arrangement of these bit fields, by way of example only, is:

vcode: bits 127.96
icode: bits 95.0

The icode is the tag ID. The vcode is a 32 bit CRC calculated using the CRC-321EEE 802.3 polynomial. This is a standard CRC used by in many places, including Ethernet, V.42, MPEG2, PNG, and POSIX cksum.

Data Processing can be implemented by a reader process. Referring to FIG. 9 a reader module can include a Processing Unit 920 (for example used in conventional PC hardware). This processor and its associated peripherals, such as RAM, non-volatile memory, keyboard, etc can be used for the purposes of storing and manipulating data. Barcode readers can be used in a number of applications, for example:

stocktaking,
tracking of items and personnel, and
recording transactions.

A Tag Number can be further associated with an object to be identified.

The tag is indicative of a unique number. A reader may hold a very large amount of information on objects of interest, and can be connected either directly or indirectly to a network of databases. The unique numbers are extracted from a single registry (for example, as described herein). The tag bearing this number may be a separate item, such as a label adhered to the surface of an object, or a paper or metal tag tied by some method to the object. It may also consist of an engraving into the object in a manner that will be described later in this patent application. This engraving may be filled with a paint, ink or glue such that the surface of the object is smooth and level after the engraving process.

Being a unique number, the tag can be associated with the object being identified in a database. If the object already has a human readable serial number, as is usually the case with a high security item, such as a firearm, the tag has to be associated with the serial number. To associate a tag with a serial number of a high security item, the following actions can be carried out, by way of example only:

a. a complete list of all high security items held in a location, or held within the entire inventory, is downloaded (or made accessible) to the reader;

b. a software application on the reader can direct the user to scan the tag on the object and associate this with the object's listing in the database. Doing this establishes in the database a enduring relationship between the ID represented on the tag and the item's record in the database.

If there is a very large number of items in the reader's memory, pointing at the item in a list can be slow and tedious. There has to be a means by which the list can be reduced to a few items or that, by typing a string of letters or numbers, a search routine finds the item within the list of records. One way of reducing the items in the list is to note their location within a warehouse and only display the items that are in that particular location. This will not work however when items have been misplaced as is often the case when one is performing a stocktake. Linking a list in memory of the reader or to having a relational database application running on the reader such that when a unique string is typed into the reader the application, with each key stroke, tries to match the string to the serial numbers of the items in the list.

Having a relational database on a handheld reader is a challenge because of the need, in most cases, for readers of this type to be economical in their use of electrical power in order to have a reasonable battery life. Being connected by some means to a more powerful machine is sometimes an option but cannot always be relied upon. The solution where high power is not an option and full time connection to a larger machine is not possible, is to have numerous arrays stored in the reader with "snippets" of unique sub-strings that comprise all of the serial numbers in the list. As the person types in, say three characters, making up some part of a total serial number, the program checks if any part of a snippet exists in any of the arrays. If so, through the intersection of sets, it is possible to find all of the records that hold this snippet and only display those records on the screen of the handheld reader.

Association of tags with objects that bear serial numbers is more relevant when one is introducing a new system of identification into an already established population of objects. It can be used for objects that already bear a unique means of identification such as serial numbers or for items that are generic in nature, eg, packaged snack food, the wrappers of which have each had etched upon them a unique code. If the tag is placed on objects at the point of manufacture, it is possible to trace their provenance from the time they were manufactured until they are consumed. Given each object can be uniquely identified by a tag, serial numbers are only necessary where there is a need for there to be a human readable means of discriminating one object from another during day to day handling. With generic items, it is common for them to be held in a database only as an item type and then the quantity held. If a unique tag system is used, individual records can be maintained, each record having, as its primary key, the unique tag number. This underlines the benefit of a central registry devoted entirely to issuing unique numbers.

Where objects bear a globally unique tag, they can be receipted by firstly referring to the Purchase Order and/or resultant Sales Invoice in the accounting records and then by scanning each item; thereby entering the code into the stores database against the sales record. Likewise, if the item or package is being issued or disposed of, the accounting voucher covering this action is inserting into the database and then the items are scanned and related to this voucher.

Laser Etcher Module

It will be appreciated that, tags may typically be printed or etched. However, printing a tag where the image is unique can be a challenge even with modern digital printing techniques. This challenge is even greater, when printing dots of about 0.1 mm in diameter. Additionally, in many instances where unique serial numbers are required, the tags must endure the same service as the object/items to which they are attached for the life of those objects. By way of example a tag, which is typically capable of being discernible by the human eye without an optical aid, should be no smaller than 4.5 mm by 3.6 mm.

An effective method of marking an object is by etching its surface. Common methods by which etching may be achieved are abrasion, peening, spark erosion or laser etching.

The divot produced by these means can then be filled with some form of pigmented glue or ink. To assist with making the markings more legible, the pigment in the ink or glue can be chosen to be fluorescent under incident radiation. Filling the etched divot, such that the adhesive substance is level with the surface of the object can reduce dirt accumulation that typically restricts legibility of the tag image, and reduces the risk of snagging and abrasion thereby extending tag lifespan.

Figure 17A:
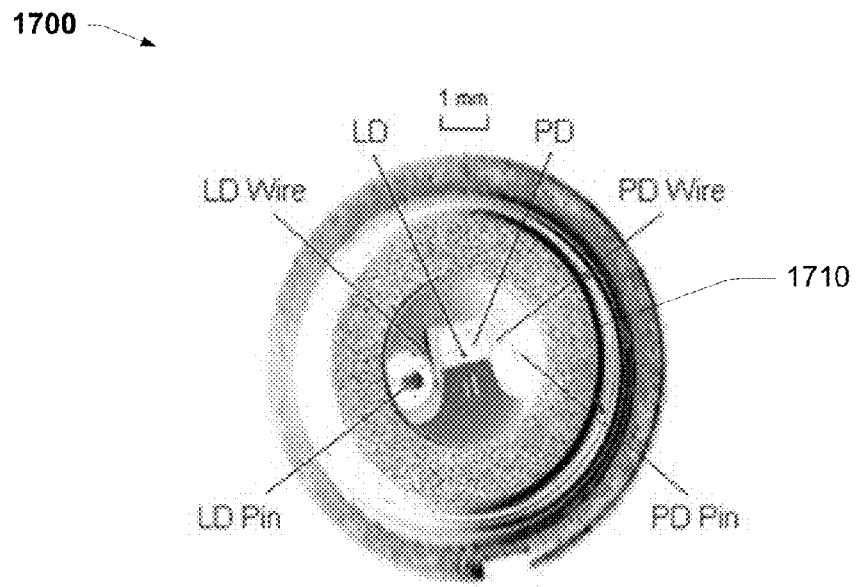
FIG. 17A-17B is an embodiment laser diode.
Figure 17B:
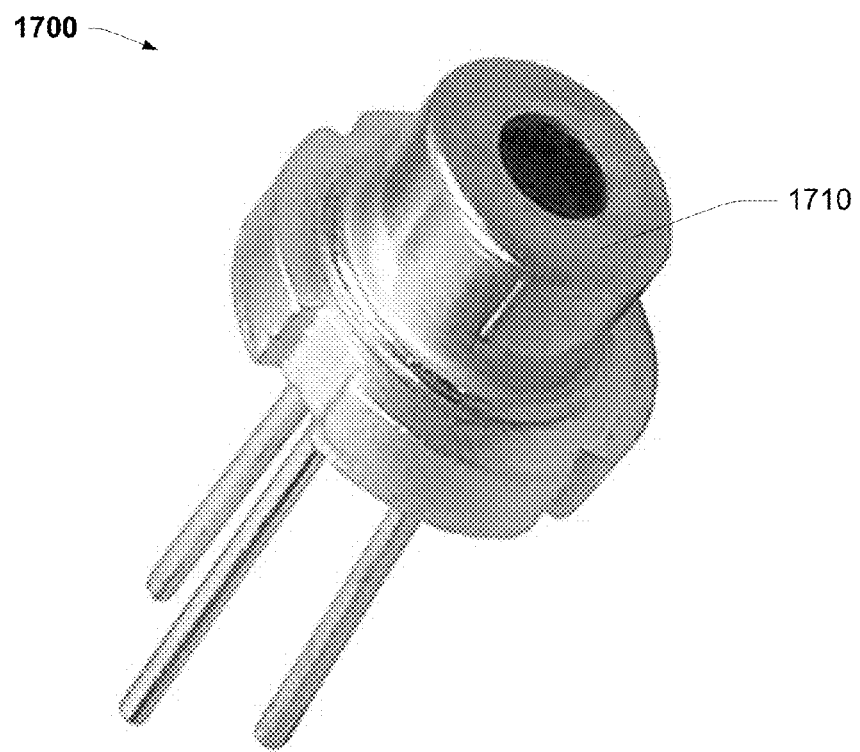

In recent years there has been considerable progress in mass producing laser diodes that produce sufficient power to write at high speed to DVD recording media, as best shown in FIG. 17A and FIG. 17B.

Figure 18:
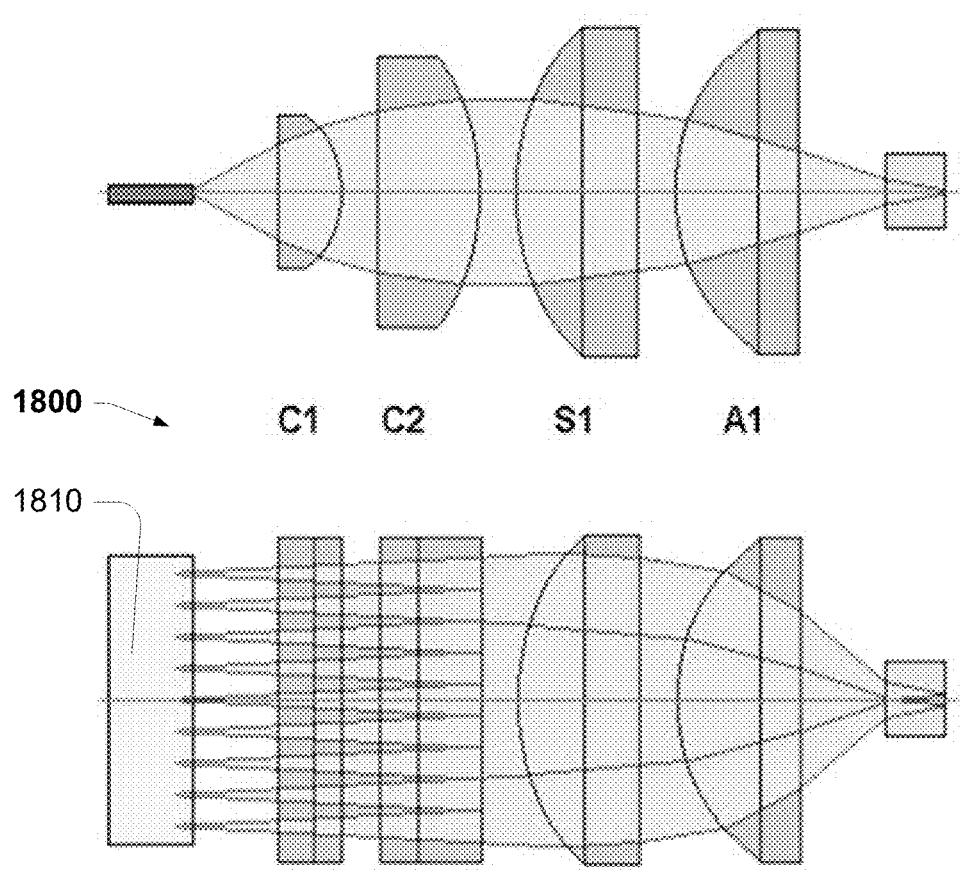
FIG. 18 is a schematic view of a laser diode configuration, showing a plurality of outputs from a laser diode semi-conductor chip being focused into one beam.

FIG. 18 discloses a schematic view showing a number of outputs from a silicon die 1810 may be combined so as to provide a beam of sufficient strength to etch the surface of an object. These same diodes are suitable for rapidly marking wrappers such as those used to package confectionery or label cans and bottles, especially when the wrapping material has been coated with a suitable layer of ink. The laser beam can quickly remove a thin layer of ink, exposing another contrasting colour underneath. It is possible that either the top layer or the layer underneath contains a fluorescent pigment, sensitive to UV light or other types of radiation to further contrast the dots comprising the tag and thereby improve readability.

For higher power, in order to etch glass or metal, a fiber laser system based around CO2 or YAG technology may be required. CO2 lasers are suitable for etching glass. YAG lasers are suitable for etching metal.

Figure 19:
FIG. 19 is an embodiment portable fiber laser system with hand-held etching head.
Figure 20A:
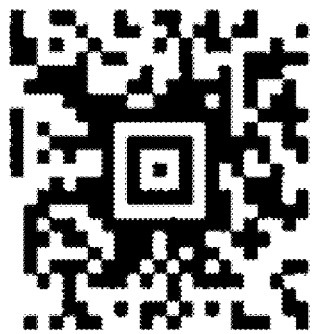
FIG. 20A-20G show embodiment tag representations.
Figure 20B:
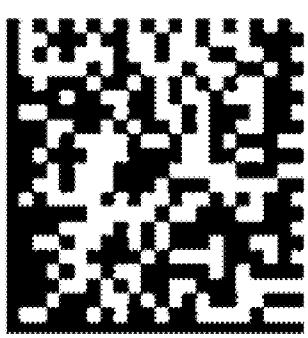
Figure 20C:
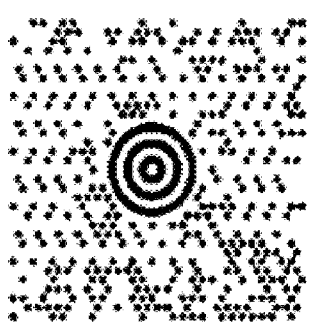
Figure 20D:
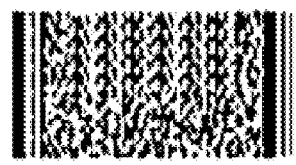
Figure 20E:
Figure 20F:
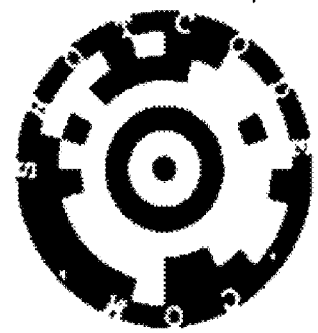
Figure 20G:
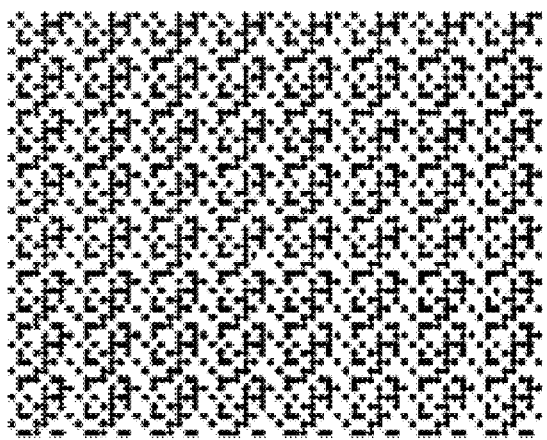

FIG. 19 shows a commercially available fiber laser etcher 1900. At the time of writing this application, these cost in the vicinity of AUD 70,000. This places devices such as this beyond the reach of small businesses and so is an impediment to the widespread take-up of this technology.

FIG. 20A through FIG. 20G show a variety of 2D barcode technologies. It can be seen the marks 2010, 2020, 2030, 2040, 2050, 2060 require geometric shapes that are more complex than a simple dot. This requires a laser etcher to have a complex mechanism for directing the laser beam. Not only is this mechanism complex, it is also subject to wear and erosion. Unlike other forms of 2D barcode, the NU-ERA barcode may be produced by an array of static laser beams of a certain diameter. By designing a tag to consist of dots, the laser etching system can be simplified. The typical tag has dot sizes of 0.1 mm, which can be within the capability of a laser diode to etch in a short enough time (say $1/100$th of a second) to be practical when marking packaging wrappers and within the capability of a fiber laser when marking metal.

Advantages of the present etching system includes: relative simplicity, lack of moving parts, ability to achieve relatively small resolution, and relatively wide range of barcoding situations.

An embodiment laser head can, by way of example only, take either of the following forms:
  a collection of 1,620 laser emitters arranged in a two dimensional array 45 across and 36 down (45×36), or
  a collection of 45 optical or 36 laser emitters arranged in a one dimensional linear array or 1×45 or 1×36 respectively.

Figure 21:
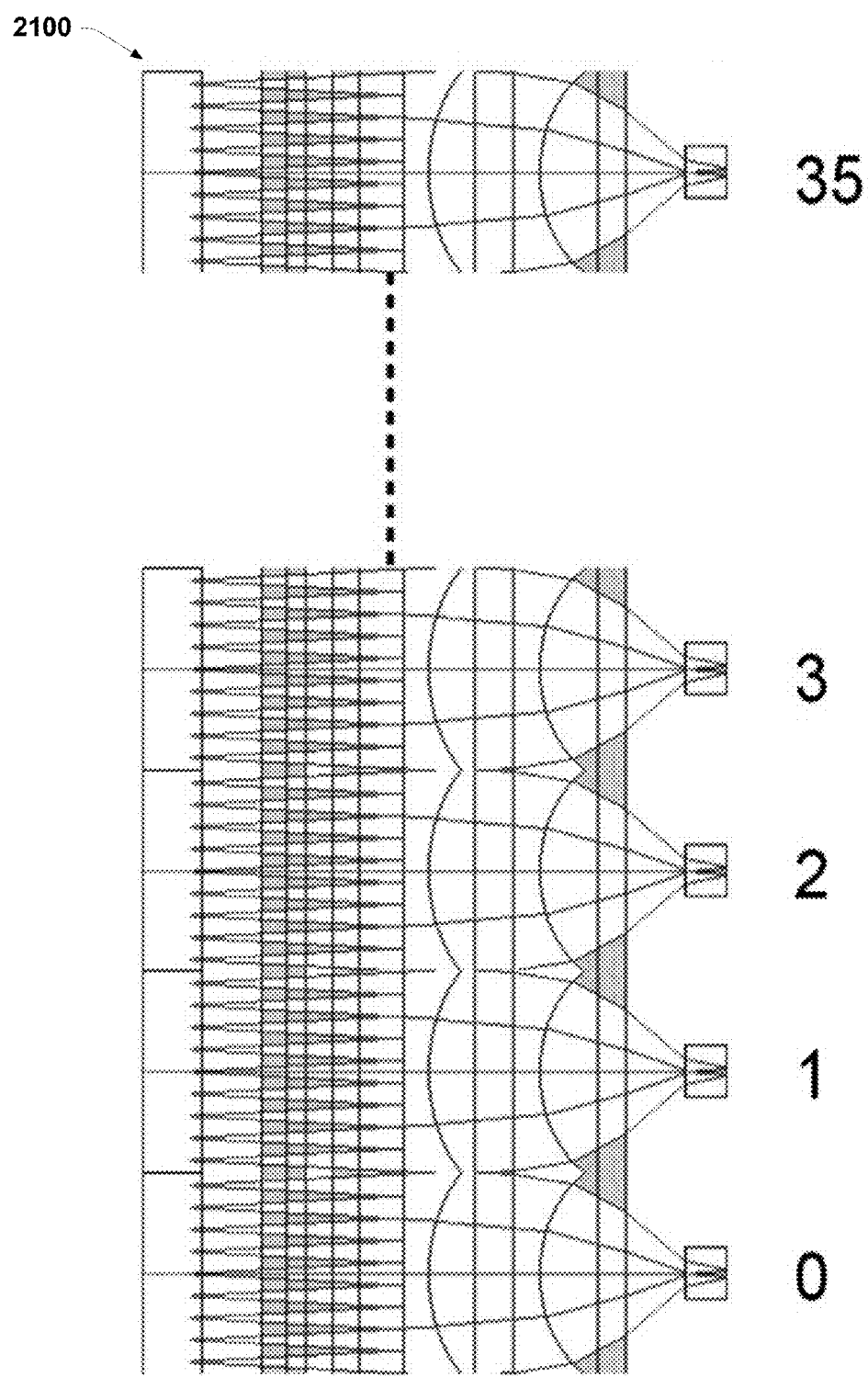
FIG. 21 is a schematic view of a laser diode configuration.

Referring to FIG. 21, it would be appreciated that a monolithic etching head 2100 can comprise a collection of solid state laser emitters, the output from these emitters possibly being aggregated and concentrated to produce beams of sufficient intensity to etch the surface of their intended target.

In a similar manner, using technology well known to those with a knowledge of laser science, it is possible to accumulate energy such that it is emitted in one strong pulse over a few nano-seconds with an extreme intensity to cause the necessary disassociation of matter on the surface of the object to be etched.

Where there is a distance between the laser emitters and the target, the laser beam may be carried and directed using optical fiber, as shown in FIG. 19. These fibers can then enter a manifold such that they are positioned relative to each other to create the array suitable for the etching a tag. They may also aim the beam such that when placed at a certain distance from the target, the dots created on the surface of the object to be etched are at the correct distance of separation from each other. Where the manifold or laser block contains all 1,620 laser beams, the arrangement will be mounted in a housing that permits it to be held in the hand and placed on or near the intended target with some precision.

Figure 22:
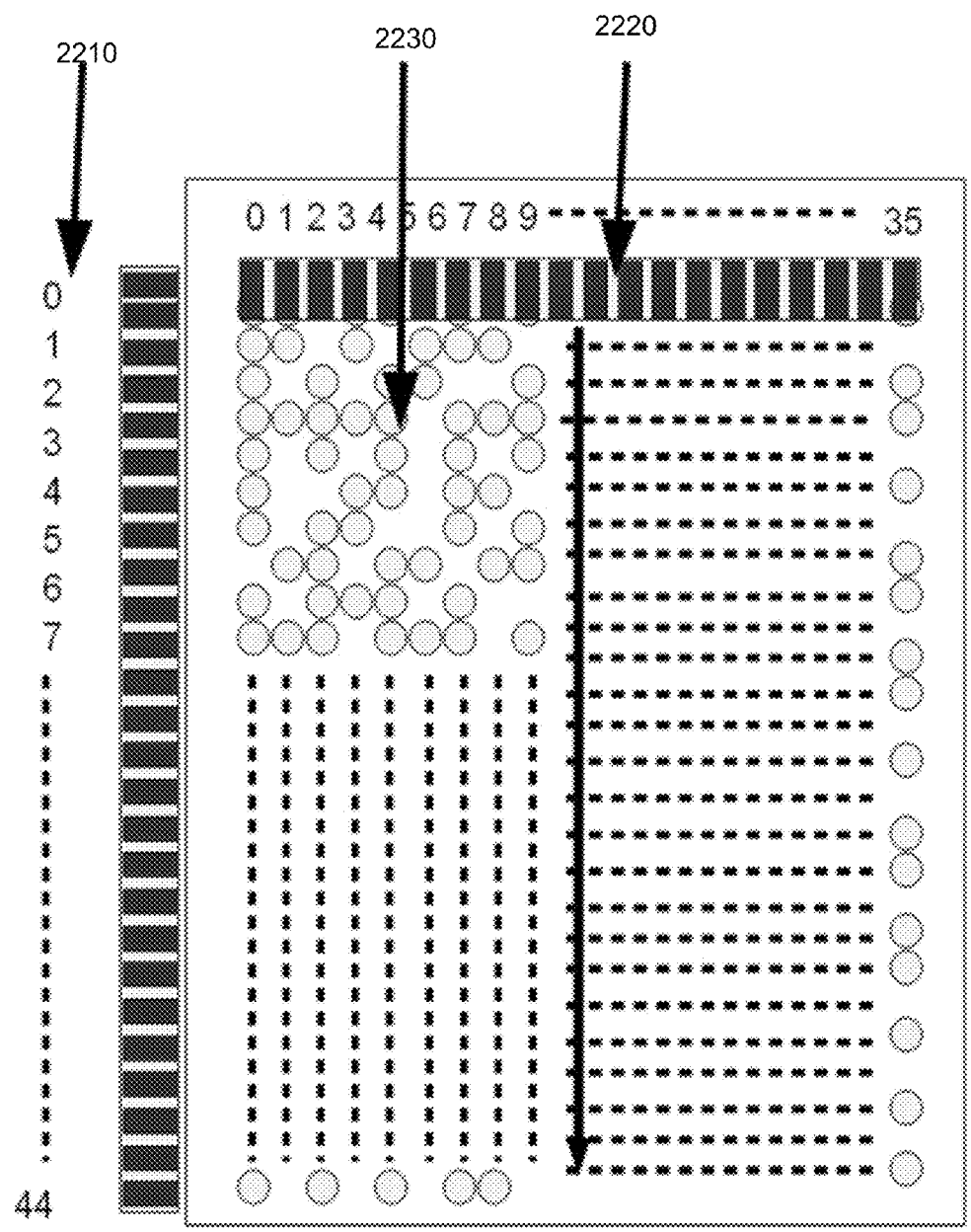
FIG. 22 is a schematic view of a partial tag, indicative of using a moving etching head comprised of multiple laser emitters.

FIG. 22 shows an example embodiment with either 45 emitters 2210 (or 36 emitters) positioned in a carriage that moves in a set direction (typically driven by a motor). The position of the head is monitored by sensors 2220 on the side of the housing such that when the head is correctly positioned the requisite number of lasers fire to create the divots required for each row of the tag pattern 2230. In a similar manner, the position of the head may be controlled by some form of stepping mechanism, either electronic or mechanical such that when the head takes a step, the lasers fire to produce the required line of dots comprising a row or column of the tag pattern.

It will be appreciated that, the number of laser diodes necessary for this invention will vary, depending on the arrangement described in above, from 1,620 to 45 (or 36). At the time of writing this application, laser diodes for DVD players cost in the order of US$0.40 cents in volume.

It will be appreciated that, when the surface of an item is etched, atoms of material vaporise off the surface. If there is not proper ventilation between the laser diodes and the surface being etched, these atoms will adhere to the lens of the laser diode and, in a short time, render the laser diode useless. A means of ventilation is therefore beneficial for the continued reliable operation of the laser head.

Registry for Issuing Unique Numbers

A central registry can be maintained, from which unique numbers are issued to customers. The numbers can be encrypted using either symmetric or asymmetric means, so as to restrict unauthorised persons or organisations from generating unauthorised tag numbers.

The system enables an enduring model of "selling" unique numbers from the registry. In essence, the registry is providing a numbering service to any commercial entity in the world. The commercial model can include any one of more of the following aspects:

registry system licensing, available to any firm in the ID tag business;

license to use this tagging can require all users to utilise the services of a global tag numbering register;

create a global e-commerce web-site where licensees can purchase sets of numbers for the tags number/IDs that they apply utilising this technology; and tag numbers will be sold.

Further advantages of the registry can include any one or more of the following:

number domain, in the case of this example, extends from 0 to 2^96.

the owner of the registry of numbers makes available enabling technology to use these numbers, that is:
  a. a 2D barcode system that can be read in any orientation without use of fiducial marks;
  b. reader firmware for enabling readers to very quickly identify and read the 2D barcode;
  c. printing/laser-etching systems that enable marking of items and/or their packaging on a production line or in a supermarket with this 2D barcode;
  d. A system of encryption of the numbers to restrict unauthorised generation of tag numbers.

number registry can allocate blocks of numbers to 2^20 registrars, that is, 1,048,576 registrars (not unlike the system of registrars presently used for issuing and administering Internet Domains).

registrars would have 2^76 numbers to on-sell, about 75,000 billion, billion numbers).

registrars can set a price per number.

When issuing numbers from a registry, it is necessary to keep track of these numbers and to whom the numbers were issued. This causes the need for a "customer-system". For ease of administration, rather than issuing a separate unique number to identify a client-system, the client system could be identified by the first number ever issued to that client-system. It will be appreciated that customers have a particular system they would find it easier to administer such as system if the numbers they were using, besides being unique, were all sequential in value.

A general method of allocating numbers to individual customer-systems, at least the following two options can be presented:

Option 1: Allocate numbers on a first come first served basis, or

Option 2: Allocate numbers according to some system of organisation.

The advantage of "Option 1" is a low level of administration necessary to organise the issuing of numbers, and there is no wastage of numbers. However, it will be necessary to keep track of each customer-system and the numbers issued to those customer-systems. It will also mean that if a customer comes back for more numbers for a particular system, the next allocation of numbers are unlikely to follow on from the previous allocation of numbers.

Option 2 requires some level of organisation as to how the numbers are allocated. Previous attempts in this area have used the approach of allocating numbers on a hierarchical system. For example, a block of numbers may be allocated on the basis of the type of application for which these numbers will be used. Within this block of numbers there may be another allocation on the basis of the region in which this application is practised. The problem with this approach is that there is the potential for largescale waste of numbers if the estimations of usage are not exact at the beginning when the allocations are made.

An allocation method for a tag registry can ensure there is a relatively low probability of wastage and that numbers allocated at different times to a particular customer-system are typically sequential.

Preferably, the identifiers/numbers that are available to the registry are:
  a. apportioned efficiently;
  b. substantially satisfy the needs of the customer-systems that are allocated the identifiers, particularly that subsequent allocations to that customer-system provide identifiers sequential to previous allocations; and
  c. involve little administration, both by a customer and a registry organisation.

In maintaining the register it is preferred that:
identifiers are not allocated to customers and not used or wasted,
administration of the registry is not onerous,
a subsequent allocation to a customer-system is contiguous from previous allocations, and
access to allocating identifiers is restricted; thereby warranting uniqueness of allocated identifiers.

The existence of a single registry, for issuing unique identifiers, can assist all to participate in world trade and financial commerce. This in turn can assist in raising the productivity of developing nations.

Figure 23:
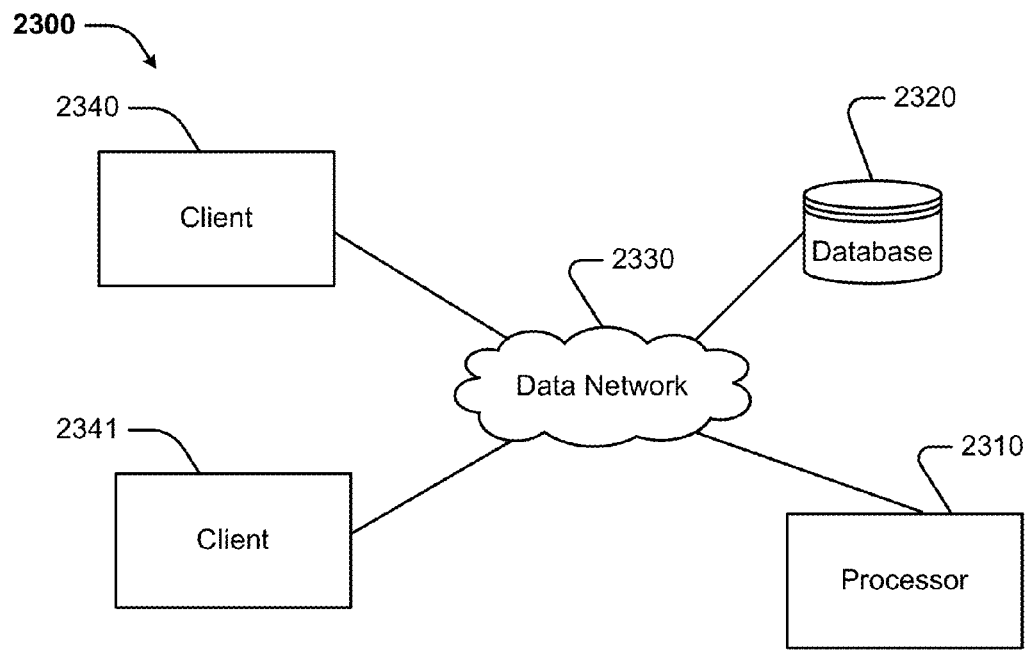
FIG. 23 is a schematic representation of an apparatus for managing unique identifiers.

FIG. 23 shows an embodiment of an apparatus 2300 adapted to allocate one or more ranges of unique identifiers (or numbers) from a registry. The apparatus includes a processor 2310 coupled to a database 2320, via a data network 2330. One or more customers 2340 and 2341 can access the processor for allocating a range of unique identifiers. The customer/entity is allocated range/block of identifiers/numbers and becomes the registered owner.

By way of example only, the potential commercial value of the registry can be identified based on the following business model. This can further enhance the value of an advanced AutoID system to manufacturers, retailers and consumers. The use of barcodes in supermarkets can significantly improve the productivity of check-outs at a point of sale. Labour savings for the supermarket can also improve consumer satisfaction, and can further increase the chance of return sales.

Preferably there must be established a number of standards, which all vendors and providers of tag readers and product numbering systems will adhere. One of these is the numbering system that uses a barcode to represent (or be indicative of) an identifier.

Linear barcode systems, typically utilised in supermarkets, are the product of an era from when computing power, particularly the capacity of computers to store very large quantities of numbers and process them in close to real-time, was not commonly available or cost-affordable. These practical limitations have resulted in the modest objectives of the linear barcode system.

Generic identification typically identifies an item as being of a certain type (for example a size 10 shoe of a particular make and model), whereas individual identification typically identifies each item specifically, (for example a specific shoe manufactured, wholesaled or retailed). With advances in computing technology, combined with a significant decrease in the cost, it is feasible to implement systems that can individually identify items.

Using individual identification, it would be possible for a retailer to identify the item being sold, and also retrieve all manner of data relating to an item (for example the date-time it was manufactured, ordered, received, placed on the shelves and sold to a consumer). This visibility of inventory could greatly improve the ability of a retailer to detect fraud with respect to such things as product quality and warranty, and could also facilitate such actions as product recalls. Preferably an individual identification labelling system, utilising a unique identifier, can offer a low cost, system of uniquely identifying items involved in commercial and financial transactions.

It would be appreciated that, preferably, all entities in a supply chain should use the same identification system; utilising a single registry of numbers from which all customers in finance and commerce draw their unique identifiers/numbers. The registrar providing this service of issuing identifiers/numbers to customers, for their sole use, could charge for this service. Preferably the identifiers are issued as a range (or block of numbers) that are guaranteed to be unique across all customers.

It will be appreciated that recording a large number of unique identifiers/numbers and, to issue a unique range to a particular customer-system, a record indicative of every issued identifier (and the customer-system to whom it was issued), requires substantial computer storage capacity. Recording the allocation of unique identifiers from an identifier domain that is large (for example in the order of $2^{128}$) requires significant computer storage capacity. It is preferable instead that there be only a recording of a summary of the allocated identifiers issued to a customer-system. For example, recording the allocation of unique identifiers can include the "begin" number and the "end" number of a sequentially allocated block of numbers.

In this example, it is preferable that customer-system be allocated identifiers that are serially-sequential, and more preferable that additional identifiers, subsequently allocated to a customer-system, are serially-sequential, commencing from an earlier allocation. These identifiers can be used by a customer-system within a system they own or manage.

It will be appreciated that a customer-system typically does not know the number of unique numbers that will be required over its lifespan. However it is preferable that all identifiers issued to a customer (both initially and subsequently) are contiguous for any particular system belonging to that customer. Managing identifiers that are not contiguous for a particular system can impose an unacceptable administrative impost on the customer.

A method and apparatus for allocation could be achieved wherein the numbers allocated to a "customer-system" were contiguous (or serially-sequential) is described by way of example. The recording of the unique numbers, allocated for each customer, can be summarised and achieved through the use of a database consisting of three relational tables.

An "Open" or "Closed" system is typically recognised, by way of example, as follows:
  a "Closed System" typically does not share its information with external entities. The system belongs to a particular firm (or group of firms), but is generally not open for use by the public. For example, a closed system includes an inventory management system of furniture in offices owned by a particular company. Each item of furniture is given a unique ID by the owner of the furniture, which may be traced back to a database providing more details about that item of furniture; including, for example, the purchase order on which it was obtained, the date of delivery, the date and means of payment, etc.
  an "Open System" typically interoperates with a number of other entities. In such a situation there is a central server (and database) that is used to interpret tags belonging to each entity, and provide a method for interpreting tag's information. With these examples of a closed system for managing/auditing office furniture, another tag may be allocated by a central industry body, and applied to the furniture, that provides details on the furniture from an industry standards database. In that example, the reader of a mark could interrogate a pre-designated server (or database) that is external to the firm for obtaining further details (or referred to another Universal Resource Locator (URL)) indicative of the item.

Figure 24A:
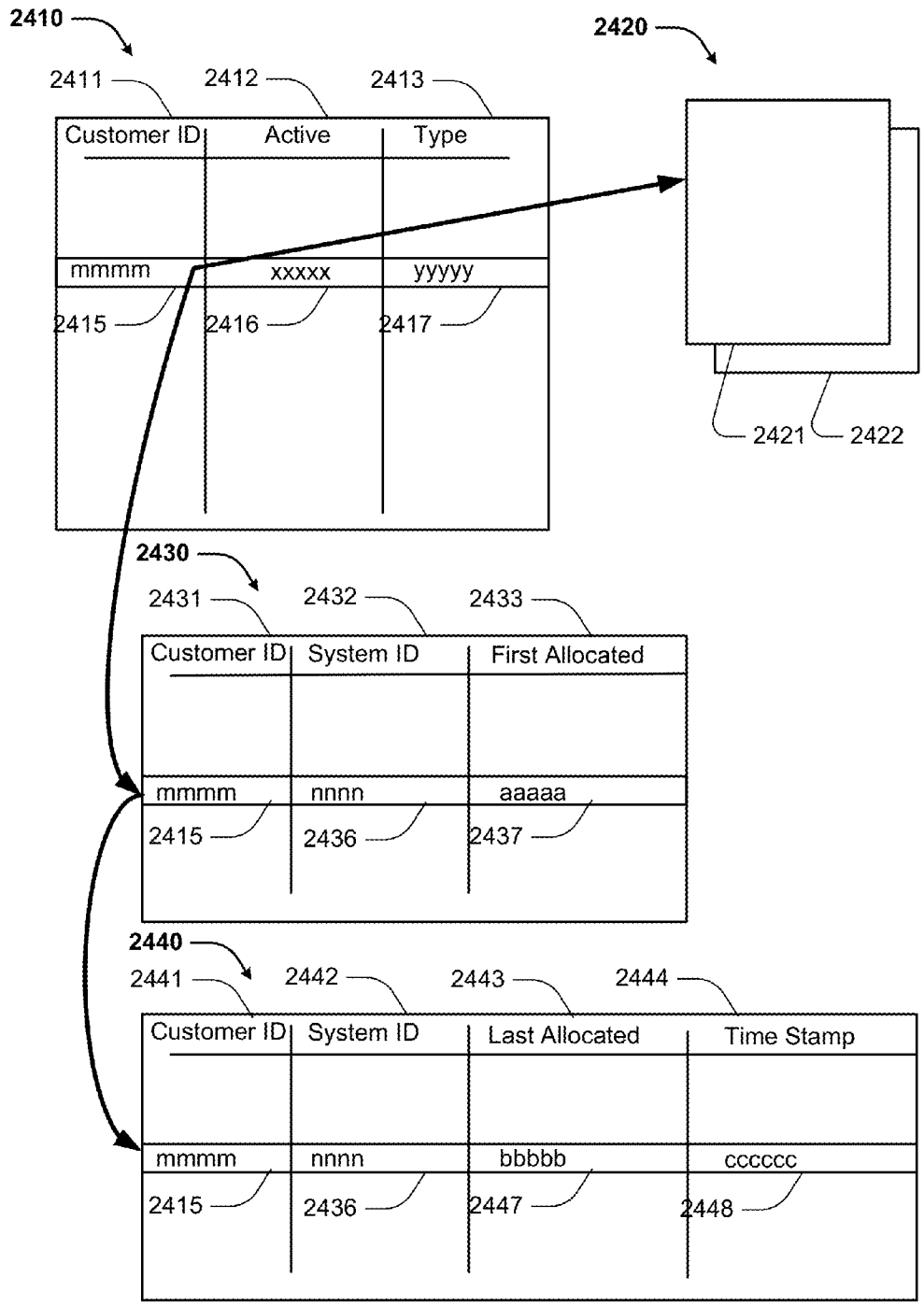
FIG. 24A is a schematic representation of a database structure for managing unique identifiers.

Referring to FIG. 24A, an example database can maintain the register using three relational tables 2410, 2430, and 2440, as described below.
  a. First Table 2410:
    (1) Customer ID 2411
      (8 bytes—range of 18,446,744,073,709,551,616 customers);
    (2) Customer Active 2412 (Boolean-1 bit); and
    (3) Customer Type ID 2413 (1 byte).
    It will be appreciated that details relating to Addresses, Phones, Notes, Contacts, can be stored in other tables 2420 (for example 2421 and 2422), and have as a key the Customer ID).
  b. Second Table 2430:
    (1) Customer ID 2431
      (8 bytes—range of 18,446,744,073,709,551,616 customers);
    (2) System ID 2432 (4 bytes—a range of 4,294,967,296 systems); and
    (3) First Number Allocated 2433 (16 bytes).
  c. Third Table 2440:
    (1) Foreign Key made up of Customer ID 2441 and System ID 2442 (12 bytes)
    (2) Last Number Allocated 2443 (16 bytes); and
    (3) Date Time Allocated 2444 (8 bytes—584 million years in ¹⁄₁,₀₀₀th second intervals)

In this example registry, allocating a first range of identifiers to a customer involves the steps of:

a) adding an entry in the first table 2410 to specify a customer ID 2415, and set Customer Active 2416 and Customer Type 2417;
b) recording client details 2421;
c) selecting a region to assign to the customer;
d) adding a record in the second table 2430 using customer ID 2415 and setting System ID 2436 and the first allocated identifier 2437;
e) adding a record in the third table 2440 using customer ID 2415 and System ID 2436 and setting the last allocated identifier 2447 and time stamp 2448;

If a customer is allocated an additional tranche of identifiers that are contiguous (or serially-sequential) from a tranche of identifiers previously allocated to the client, then only a new record to the third table 2440 is added.

In this example, each record in the second table 2430 will occupy 28 bytes and each record in the third table 2440 will occupy 36 bytes. For one million registered customer-systems the second table 2430 would occupy 28 Megabytes and third table 2440 would occupy 36 Megabytes, occupying a total of 64 Megabytes in storage. It will be appreciated that the first table 2410 and the customer table 2420 providing customer details would also require further storage capacity.

In this example, if each customer had an average of 10 systems, then the second table 2430 would occupy 280 Megabytes and third table 2440 would occupy 360 Megabytes, occupying a total of 640 Megabytes in storage. Further, if each custom-system were to be allocated 100 sets of numbers during its life, third table 2440 would occupy 6.4 Gigabytes. These records fit easily within current storage systems (for example a USB memory stick or low power hand-held portable data capture unit).

This data structure (database) simplifies administration of the registry and identification of allocated numbers. Other systems may need to record every number allocated to every customer-system. As identifiers are allocated sequentially, this data structure only requires a record of the limiting identifiers issued to the client and the date and time the issue was made.

This registry and allocation method can also indicate if the identifiers belong to an open or closed system. A customer can be allocated a new Customer ID for each type of system identifiers that are to be allocated. A continuous tranche of numbers is allocated for each system belonging to each customer. The characteristics of each system are described in another table within the database. Characteristics can include whether the system is open or closed, an associated URL or associated permanent IP address (for example an IP address that a reader can connect to for obtaining additional information regarding the identifier.

Figure 24B:
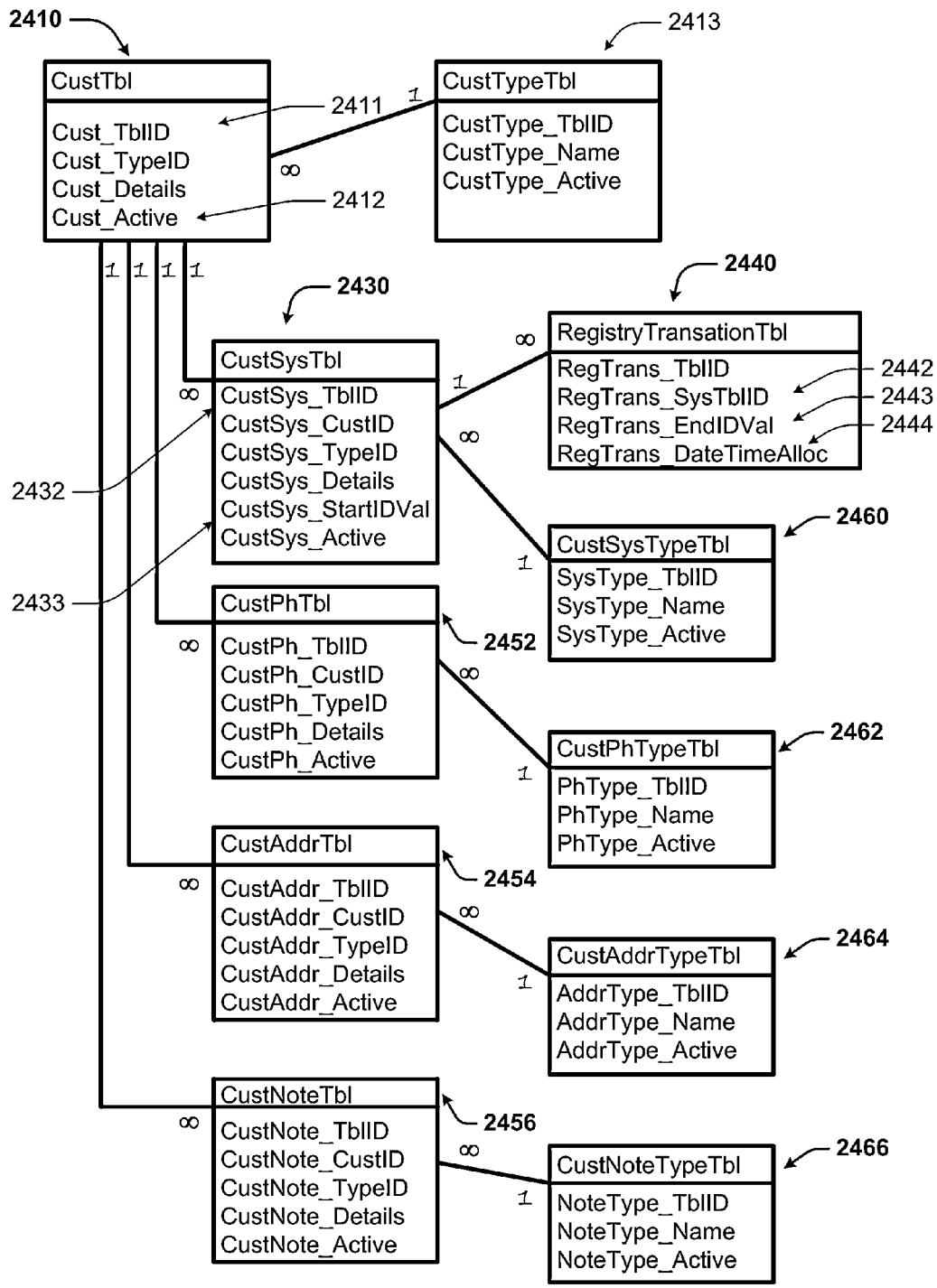
FIG. 24B is a schematic representation of a database structure for managing unique identifiers.

Referring to FIG. 24B, an alternative example database can maintain the register using a plurality of relational tables, as described below.

A Customer Table (CustTbl) 2410 includes:
(1) a customer table identifier (Cust_TblID) 2411;
(2) a customer type identifier (Cust_TypeID);
(3) a customer details (Cust_Details);
(4) a customer active indicator (Cust_Active) 2412;

In this example embodiment the Customer Table entry links to an entry of a Customer Type Table (CustTypeTbl) 2413 which includes:
a customer type table identifier (CustType_TblID);
a customer type name (CustType_Name);
a customer type active indicator (CustType_Active).

In this example embodiment the Customer Table entry further links to one or more entries of each of a Customer System Table, a Customer Phone Table, a Customer Address Table, and a Customer Note Table.

The Customer System Table (CustSysTbl) 2430 includes:
(1) a customer system table identifier (CustSys_TblID) 2432;
(2) a customer system customer identifier (CustSys_CustID);
(3) a customer system type identifier (CustSys_TypeID);
(4) a customer system details (CustSys_Details);
(5) a customer system start identifier value (CustSys_StartIDVal) 2433;
(6) a customer system active indicator (CustSys_Active);
and which entries are associated with a Customer System Type Table (CustSysTypeTbl) 2460 which includes:
a system type table identifier (SysType_TblID);
a system type name (SysType_Name);
a system type active indicator (SysType_Active).

The Customer Phone Table (CustPhTbl) 2452 includes:
(1) a customer phone table identifier (CustPh_TblID);
(2) a customer phone customer identifier (CustPh_CustID);
(3) a customer phone type identifier (CustPh_TypeID);
(4) a customer phone details (CustPh_Details);
(5) a customer phone active indicator (CustPh_Active);
and which entries are associated with a Customer Phone Type Table (CustPhTypeTbl) 2462 which includes:
a phone type table identifier (PhType_TblID);
a phone type name (PhType_Name);
a phone type active indicator (PhType_Active).

The Customer Address Table (CustAddrTbl) 2454 includes:
(1) a customer address table identifier (CustAddr_TblID);
(2) a customer address customer identifier (CustAddr_CustID);
(3) a customer address type identifier (CustAddr_TypeID);
(4) a customer address details (CustAddr_Details);
(5) a customer address active indicator (CustAddr_Active);
and which entries are associated with a Customer Address Type Table (CustAddrTypeTbl) 2464 which includes:
an address type table identifier (AddrType_TblID);
an address type name (AddrType_Name);
an address type active indicator (AddrType_Active).

The Customer Note Table (CustNoteTbl) 2456 includes:
1. a customer note table identifier (CustNote_TblID);
2. a customer note customer identifier (CustNote_CustID);
3. a customer note type identifier (CustNote_TypeID);
4. a customer note details (CustNote_Details);
5. a customer note active indicator (CustNote_Active);
and which entries are associated with a Customer Note Type Table (CustNoteTypeTbl) 2466 which includes:
a note type table identifier (NoteType_TblID);
a note type name (NoteType_Name);
a note type active indicator (NoteType_Active).

In this example embodiment the Customer Table entry links to one or more entries of a Registry Transaction Table (RegistryTransactionTbl) 2440 which includes:
a registry transaction table identifier (RegTrans_TblID);
a registry transaction system table identifier (RegTrans_SysTblID) 2442;
a registry transaction end identifier value (RegTrans_EndIDVal) 2443;
a registry transaction time date allocate indicator (RegTrans_DateTimeAlloc) 2444.

Figure 25:
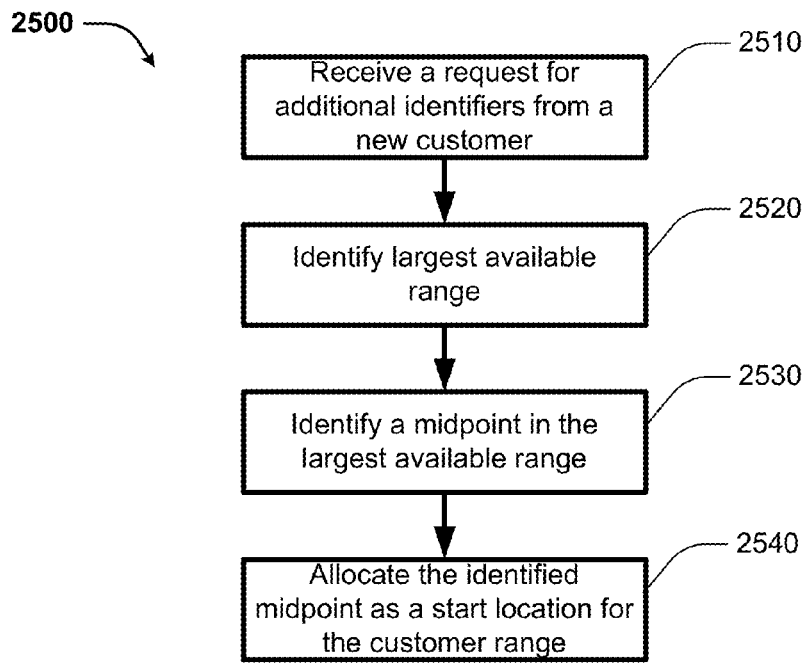
FIG. 25 is a flowchart of a method for allocating a unique identifier from a register to a new customer-system.

Referring to FIG. 25, an example method 2500 for allocating a first range of identifiers to a customer involves the steps of:

a) Step 2510, receiving a request for additional identifiers from a new customer-system;
b) Step 2520, identifying the largest available range;
c) Step 2530, identifying the midpoint in the largest available range; and
d) Step 2540, allocating the identified midpoint as the start location for the customer-system's range.

Figure 26:
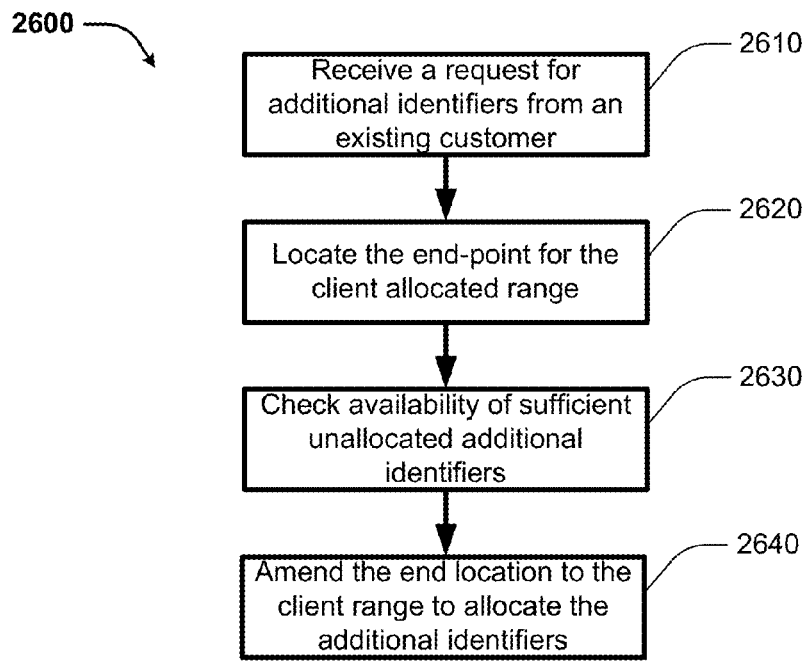
FIG. 26 is a flowchart of a method for allocating a unique identifier from a register to an existing customer-system.

Referring to FIG. 26, an example method 2600 for allocating an additional range of identifiers to a customer-system involves the steps of:
a) Step 2610, receiving a request for additional identifiers from an existing customer-system;
b) Step 2620, locating the end-point for that customer-system's previously allocated range;
c) Step 2630, checking availability of sufficient unallocated additional identifiers that are contiguous (or serially-sequential) to the located customer-systems previously allocated range; and
d) Step 2640, amending the end location to the client range to allocate the additional identifiers.

Figure 27A:
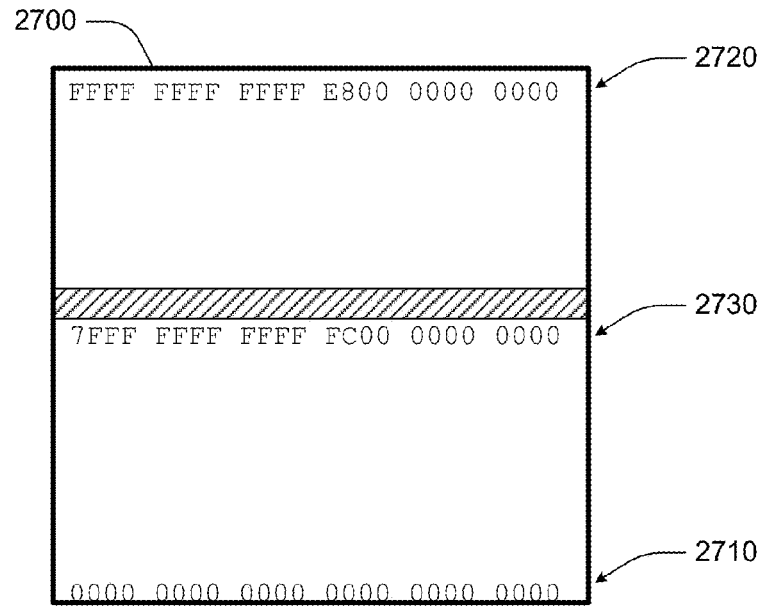
FIG. 27A is a schematic representation of a register structure, showing allocated unique identifiers.
Figure 27B:
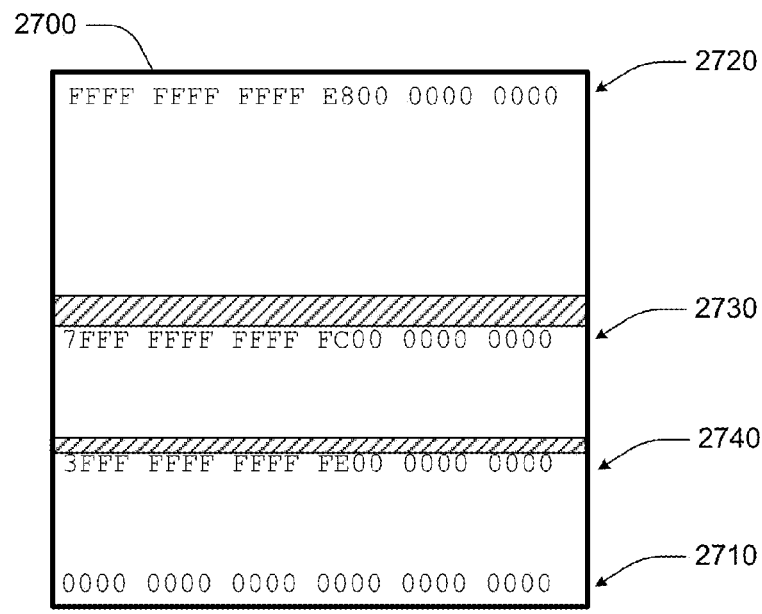
FIG. 27B is a schematic representation of a register structure, showing allocated unique identifiers.
Figure 27C:
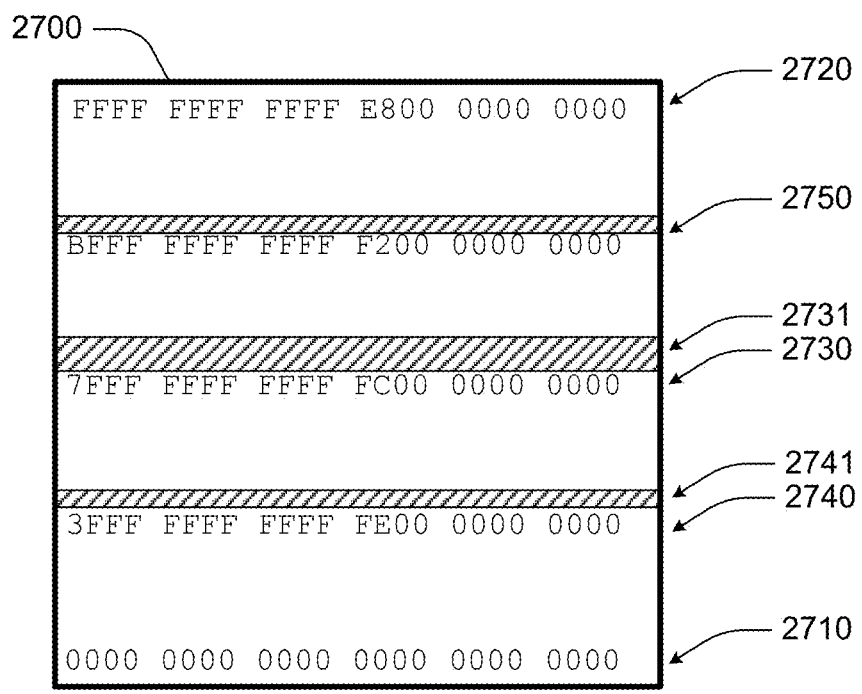
FIG. 27C is a schematic representation of a register structure, showing allocated unique identifiers.

FIG. 27A, FIG. 27B and FIG. 27C shows an example registry 2700, identifying allocation of identifiers to customers according to the above method. This example involves 96 bit identifiers ranging between 0 and $2^{96}$, identified as 2710 and 2720 respectively. A "domain space distance" is defined as the quantity of unallocated/available numbers, between two points in the "domain". The allocation may go from the middle upwards or from the middle downwards, but the one convention should be adhered to, except in the remote circumstance where there are insufficient numbers in that direction to maintain a contiguous set, for the life of this registry.

FIG. 27A depicts the allocation of the first tranche of numbers 2430 from the registry, which is the middle of the largest space of free identifiers. In this example, the first allocation to a customer commences at $2^{95}$, mid-point between 0 and $2^{96}$. The allocation assigned identifiers that increase from $2^{95}$.

FIG. 27B depicts the allocation of the second tranche of numbers 2440 from the registry, which is also the middle of the largest space of free identifiers. Based on the principle of bisecting the largest "domain space distance" of available numbers, the next allocation is to this space is between 0 and $2^{95}$.

FIG. 27B depicts the allocation of the second tranche of numbers 2450 from the registry, which is also the middle of the largest space of free identifiers. Once the second tranche allocation is applied, and subject to the size of the first allocated tranche, the largest available domain space distance is from the end of the first allocated tranche to the top of the domain. In this example, the third allocation will be about BFFF FFFF FFFF F200 0000 0000, and subject to the size of the first allocated tranche.

This process is then repeated for each new customer-system, in which a new allocation is made halfway within the largest domain space available at that time.

Additional identifiers can also be allocated to an existing customer-system. In the above example, if the customer allocated the second tranche requests additional identifiers for the associated customer-system, the allocation is provided from the last allocation. It will be appreciated that because the distances between each allocation are initially selected as the maximum available, the chances of a collision with another client-system is substantially reduced.

Encryption can be applied to identifiers provided from a registry system, preferably using a commonly available and well proven encryption technique. Customers can be supplied with the encrypted version of an identifier for use with a mark (for example a 2D Barcode or any other system of AutoID) and the decrypted identifier for use within computer systems. Provided the system of encryption remains unbroken, this arrangement prevents the construction of counterfeit identifiers or compatible identifiers, and also limits competitors from establishing compatible registries.

It will be appreciated that encryption also gives the registry its "character". For example it would be possible for there to be more than one registry with each registry using a different "type of encryption" and another registry that uses another type of encryption where the term "type of encryption" not only covers the value of the key used but also the encryption algorithm. Depending on whether the user could decrypt the number would determine whether the number had come from the correct registry for that customer-system.

It will be appreciated that embodiments of the registry method and apparatus provides one or more of the following features:
- a customer-system is allocated a contiguous run of numbers, benefiting administration of each system;
- allocation enables improved utilisation of the registry;
- numbers within a 96 bit domain are significantly large—for example, if a thousand billion numbers were issued a year, the registry would not be exhausted for billions of years;
- the chances of an allocation attempt for one customer-system colliding with another is remote;
- in the event of a allocation attempt for one customer-system colliding with another, the customer-system would be allocated another ID and a new allocation would be established in the middle of the largest unallocated domain space;
- administering the register required keeping track of customers, their systems, the limits of the allocation provided to each customer-system and the date/time of that allocation;
- administration of the register enables establishing portable (or distributed) databases on hand-held systems;
- a separate database can store and manage additional features (for example, indicating if a system is open or closed, or the URL or URLs a reader should interrogate for information), the size of which is likely to small enough to be stored on a hand-held reader.
- flexibility is provided to accommodate any changes as they arise.
- encryption can be utilised to prevent the creation of counterfeit new identifiers, and limit competitors issuing compatible identifiers from imitation databases.
- the ability to have a number of registries all using different types of encryption as defined above.

An embodiment provides a registry of identifiers/numbers, with a method of allocation including the steps:
a) commencing allocating identifiers from the centre (or some point approximating the centre) of the largest domain space of unallocated/available identifiers/numbers,
b) allocating identifiers on the basis of a unique need (for example in the case of the above example a "customer-system"), and
c) subsequent allocation of additional identifiers to a range assigned for an existing "customer-system", that allocation commences from the point of the last identifier (plus 1) of the previously allocated range assigned to an existing "customer-system" and
d) providing an Encrypted identifier to the customer.

An embodiment of a registry is of practical utility as an advanced AutoID system. The use of this registry can allow the sale of unique identifiers, having considerable commercial value.

The registry enables development of systems that can individually identify (or be used to label) every object of commercial and financial significance. A labelling method and system can include a "LARGE NUMBER ID TAGGING SYSTEM" disclosed in Patent Co-operation Treaty application No. PCT/AU2008/000613, which is herein incorporated by reference.

It will be appreciated that, a "Customer-Systems" may be satisfied by this method of unique number allocation. The customer typically owns and/or operates one or more systems that utilise an allocation of numbers. These systems are typically comprised of various software applications and physical processes people or machines must carry out to produce a product or effect or to deliver a particular service. Typically, each system is taken to need a different allocation of unique identifies. This allocation of unique identifiers is, by way of example only, illustrated by calling each request for a block of numbers as having been generated to satisfy the needs of a "customer-system". A customer-system is typically allocated a range/block of identifiers/numbers and becomes the registered owner of that range/block of identifies.

Figure 28:
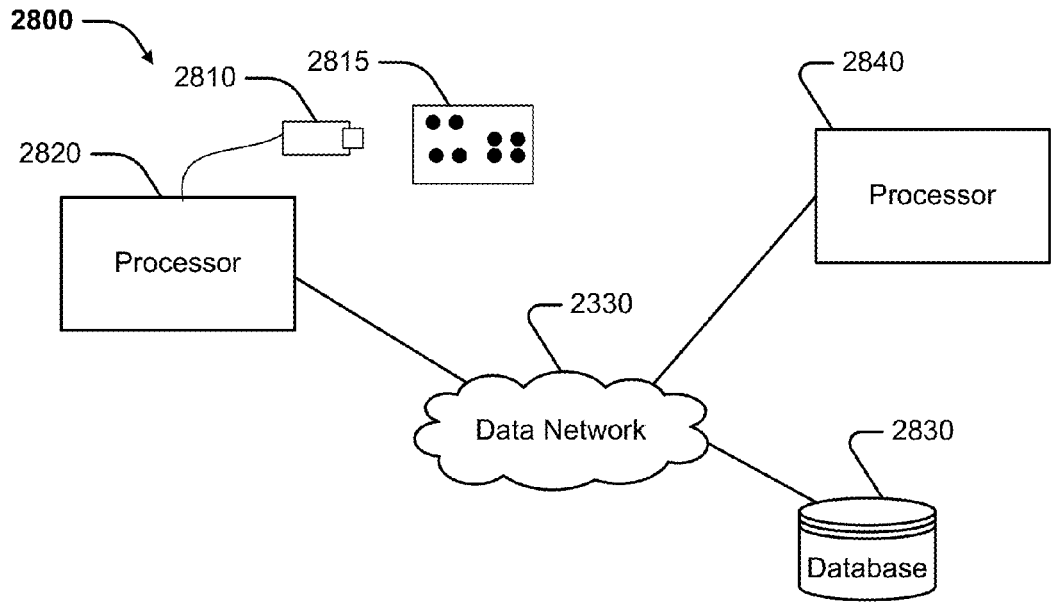
FIG. 28 is a schematic representation of an apparatus for decoding a unique identifier.

FIG. 28 shows, by way of example, a schematic representation of an apparatus 2800 for decoding a unique identifier. The apparatus includes an input device 2810 adapted to receive data indicative of a mark 2815 (comprising a unique identifier). A processor is adapted to receive and decode (and if appropriate authenticate and decrypt) the data to provide an associated unique identifier. The processor 2820 can interrogate a database 2830 to receive relevant information. In this example the processor 2820 is coupled to the database 2830 via a data network 2330. Alternatively the unique identifier can be transmitted to another processor 2840, which can interrogate the database for associated stored information.

Figure 29:
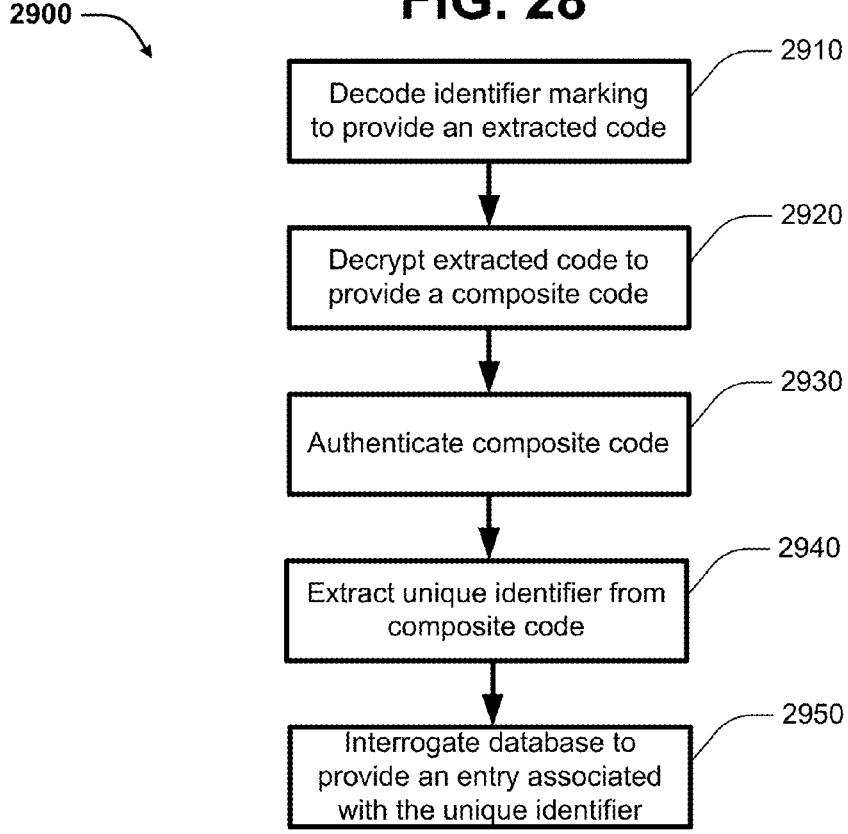
FIG. 29 is a flowchart of a method for decoding a unique identifier.

FIG. 29 shows, by way of example, a flowchart of a method for decoding a unique identifier. The method comprises:
a) step 2910, receiving and decoding an identifier marking to provide an extracted code;
b) step 2920, decrypting the extracted code to provide a composite code;
c) step 2930, authenticating the composite code;
d) step 2940, extracting a unique identifier from the composite code; and
e) step 2950, interrogating a database to provide an entry associated with the unique identifier.

In an embodiment, the decoding and decryption process consists of a cascade of the following functions:
decoding function, and
decryption function.

It would be appreciated that a plurality of encryption and decryption methodologies can be used, including Symmetric and Asymmetric. AES256 is an example of symmetric encryption. Elliptic Curve Cryptography is an example of asymmetric cryptography.

In the case of AES256, the key is kept secret from users if security is to be maintained. If the decryption method was provided to users by way of a conventional software program it would be a simple matter for a knowledgeable person to determine the key being used. Therefore, the decryption device is typically provided in a hardware device such that a person is restricted from extracting the key.

In the case of Elliptic Curve Cryptography (ECC), users can be provided with the public key which will enable them, using software, to decrypt a number but the private key, used to create numbers can be held secret. The use of ECC then satisfies the primary function of the encryption system, ie, allowing users to ascertain the authenticity of the numbers they are using but it eliminates the need for separate hardware to achieve this objective. En an embodiment, for security of Elliptic Curve Cryptographic the number is typically be 256 bits—whereby a 128 bit number can be vulnerable to cracking by a determined attacker with advanced computing resources.

It will be appreciated that the tag can represent an encrypted number indicative of a registry number issued by a registry. By way of example—the registry may provide the number pair of registry number and encrypted number; the registry may provide the encrypted number from which a customer may decrypt to produce a registry number (preferably belonging to a sequential range of client allocated register numbers); or the allocated registry number is encrypted prior to application to a tag (for example by a customer). The encrypted number can be decrypted to produce the registry number.

It will be appreciated that the illustrated apparatus and methods can enable two dimensional barcode identification tagging of objects with users being able by a variety of means to determine that the numbers used to identify the objects has come from a valid source. More specifically, by way of example, two dimensional barcode identification tagging of objects utilising a range of unique numbers. More specifically, by way of example, the apparatus and method can identify a two dimensional barcode tag on objects.

Interpretation

Unless specifically stated otherwise, as apparent from the following discussions, it is appreciated that throughout the specification discussions utilising terms such as "processing", "computing", "calculating", "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "processing system", or equivalently: "computer", "computing machine" or a "computing platform" may include one or more processors.

Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single processor "processing system" is illustrated, the term "processing system" shall also be taken to include any collection of processors that individually or jointly execute a set (or multiple sets) of instructions to perform any one or more of the methodologies discussed herein.

Methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. A computer-readable carrier medium may form, or be included in, a computer program product. The computer readable medium comprises computer code for executing a method as herein described. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Thus, one embodiment of each of the methods described herein is in the form of a computer-readable carrier medium carrying a set of instructions, e.g., a computer program that are for execution on one or more processors, e.g., one or more processors that are part of whatever the device is. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Furthermore, some of the embodiments are described herein as a method or combination of elements of a method that can be implemented by a processor of a processing system (or computer) or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

The software (or computer program) may further be transmitted or received over a network via a network interface device. While the carrier medium is shown in an exemplary embodiment to be a single medium, the term "carrier medium" should be taken to include a single medium or multiple media (e.g., a centralised or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

Thus, while there has been described what are believed to be the preferred embodiments of the invention, those skilled in the art will recognise that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Any one of the terms "comprising", "comprised of" or "which comprises" is an open term that means including at least the elements/features that follow, but not excluding others. Thus, the term comprising, when used in the claims, should not be interpreted as being limited to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term "coupled", when used in the claims, should not be interpreted as being limited to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practised in the absence of any element which is not specifically disclosed herein.

The claims defining the invention are as follows:

1. A tag reading apparatus for reading a tag adapted to store a number, the apparatus comprising:
   a lens element being adapted to control focus, zoom and ingress light;
   an image capture element for obtaining image data;
   a processor element adapted to apply one or more digital processing functions to the image; the processor element being adapted to:
   calculate the presence and approximate centroid of a tag in the image data, and
   compute a framed image data indicative of the tag;
   extract a plurality of array segments each indicative of the number; and
   calculate, from the plurality of array segments, code data indicative of the number.

2. The apparatus according to claim 1, wherein the plurality of array segments are each indicative of an identical arrangement of marks on the tag.

3. The apparatus according to claim 2, wherein the tag comprises a pattern of marks indicative of a number created by an encryption algorithm, and wherein the tag reader is adapted to decrypt the extracted code vector.

4. The apparatus according to claim 1, wherein the image capture element operates with a high frame rate.

5. The apparatus according to claim 4, wherein the lenses element, in use, continuously cycles between focusing long and short.

6. The apparatus according to claim 5, wherein the one or more digital processing functions include an error checking and a decryption algorithm for confirming the correct reading and authenticity of the tag.

7. A method of reading a tag adapted to store a number, the method comprising the steps of:
   (a) detecting there are tags in the field of view by using an algorithm that calculates a value indicative of probability one or more tags is observed;
   (b) calculating a location indicative of a centroid for each of the one or more tag within the field of view;
   (c) receiving a first image data indicative of a first tag;
   (d) orientating, scaling and framing the image data to generate a framed image data indicative of the first tag; and
   (e) extracting, from the framed image data, a data matrix indicative of marks of the first tag;
   (f) extracting, from the data matrix, a plurality of array segments each indicative of the number;

(g) calculating, from the plurality of array segments, a code data indicative of the number.

8. The method according to claim 7, wherein orientating and scaling the image comprises auto-correlation of a horizontal vector and auto-correlation of a vertical vector of an array calculated by rotating the first image.

9. The method according to claim 7, wherein orientating and scaling the image comprises iterating the step to find an optimal orientation and scale according to a cost function.

10. The method according to claim 7, further comprising the step of decoding the plurality of array segments to provide a first confirmed bit vector indicative of the number.

\* \* \* \* \*